United States Patent
Zalusky et al.

(10) Patent No.: US 10,040,401 B1
(45) Date of Patent: Aug. 7, 2018

(54) LOCKING FIREARM HOLDER

(71) Applicant: Echo Zulu, LLC, Circleville, OH (US)

(72) Inventors: James Thomas Zalusky, Beavercreek, OH (US); Eric James Zalusky, Circleville, OH (US)

(73) Assignee: Echo Zulu, LLC, Circleville, OH (US)

( * ) Notice: Subject to any disclaimer, the term of this patent is extended or adjusted under 35 U.S.C. 154(b) by 0 days.

(21) Appl. No.: 15/652,930

(22) Filed: Jul. 18, 2017

Related U.S. Application Data

(60) Provisional application No. 62/371,887, filed on Aug. 8, 2016.

(51) Int. Cl.
*B60R 7/14* (2006.01)
*F41A 23/18* (2006.01)

(52) U.S. Cl.
CPC ............... *B60R 7/14* (2013.01); *F41A 23/18* (2013.01)

(58) Field of Classification Search
CPC . B60R 7/14; F41A 23/18; F41A 17/54; F41A 17/46; F41A 17/00; F41C 33/02; F41C 33/0263
See application file for complete search history.

(56) References Cited

U.S. PATENT DOCUMENTS

| | | | |
|---|---|---|---|
| 1,421,578 A | 7/1922 | Schussler | |
| 1,430,081 A * | 9/1922 | Holler | B60R 7/14 224/281 |
| 1,557,339 A * | 10/1925 | Sander | B60R 7/14 224/542 |
| 2,132,323 A * | 10/1938 | Sander | B60R 7/14 224/281 |
| 2,655,298 A | 10/1950 | Riley | |
| 3,464,606 A | 9/1969 | Nordeen | |
| 3,718,240 A | 2/1973 | Rose | |
| 4,984,725 A | 1/1991 | Urbom | |
| 5,284,281 A | 2/1994 | Nichols | |
| 5,511,711 A | 4/1996 | Kunz | |
| 5,662,219 A | 9/1997 | Tschudy et al. | |
| 5,996,865 A | 12/1999 | Bissey | |
| 6,230,946 B1 | 5/2001 | Vor Keller et al. | |
| 6,405,909 B1 | 6/2002 | Burnett et al. | |
| 6,533,149 B2 | 3/2003 | Vor Keller et al. | |
| 6,585,209 B1 | 7/2003 | Mattingly | |
| 6,588,635 B2 | 7/2003 | Vor Keller et al. | |
| 7,200,965 B2 | 4/2007 | Vor Keller et al. | |
| 7,584,861 B2 | 9/2009 | Werner | |

(Continued)

*Primary Examiner* — Corey Skurdal
(74) *Attorney, Agent, or Firm* — Frederick H. Gribbell

(57) ABSTRACT

A locking firearm holder that can be mounted in a vehicle; the holder employs a capture lever to lock or grip against the trigger guard of a firearm, such as a hand gun. The holder exhibits two stable states: a capture lever lock state or a capture lever unlock state. The method of switching between these two stable states is the same in either case: the user pushes against the firearm, along the axis of the firearm. This initial action by the user either locks the firearm in place, or unlocks the holder to allow the user to withdraw the firearm from the holder. The holder includes a withdrawal limiter to prevent premature re-locking as the firearm is being released. The holder includes a lock tab positioned near the locked firearm; the lock tab must be actuated to unlock the holder, thus preventing an accidental unlocking due solely to vibration.

22 Claims, 16 Drawing Sheets

(56) References Cited

U.S. PATENT DOCUMENTS

| | | |
|---|---|---|
| 8,020,332 B2 | 9/2011 | Giebel et al. |
| 8,186,188 B1 * | 5/2012 | Brown .................... E05G 1/005 |
| | | 109/45 |
| 8,602,275 B1 | 12/2013 | Kiger et al. |
| 8,752,742 B2 * | 6/2014 | Clark .................. F41C 33/0281 |
| | | 224/243 |
| 9,010,600 B1 | 4/2015 | Gleaton et al. |
| 9,227,573 B2 | 1/2016 | Hudspeth |
| 9,340,163 B2 * | 5/2016 | Baker ....................... B60R 7/14 |
| 2014/0231480 A1 * | 8/2014 | Baker ....................... B60R 7/14 |
| | | 224/567 |
| 2015/0129383 A1 | 5/2015 | Kirby, Jr. |
| 2015/0129440 A1 | 5/2015 | Abascal |
| 2015/0343958 A1 | 12/2015 | McGoldrick et al. |

\* cited by examiner

LOCKING FIREARM HOLDER

TECHNICAL FIELD

The technology disclosed herein relates generally to equipment for holding a firearm (such as a hand gun) in a user-accessible holder and is particularly directed to firearm holder of the type which employs at least one capture lever (acting like a jaws) to grip the trigger guard of a firearm. An embodiment is disclosed in which the exemplary firearm holder has two stable states: a capture lever lock state (e.g., the "jaws" are closed, and this is a firearm "capture state"), and a capture lever unlock state (e.g., the "jaws" are open, and this is a firearm "non-capture state"). The method of switching between these two stable states is the same in either case, by using a push action along the main axis of the firearm.

The locking firearm holder disclosed herein is implemented by a number of cams and cam followers. One cam, hereinafter referred to as the "stator cam," is a rotary cam having an even number of lobes. Each lobe is a substantially helical and/or linear surface that either terminates closer to the firearm along the axis of the centerline of the locking firearm holder (hereinafter referred to as a "notch") or farther from the firearm along the axis of the centerline of the locking firearm holder (hereinafter referred to as a "slot"). Each notch and each slot corresponds to one of the "capture lever unlock" (jaws open) and "capture lever lock" (jaws closed) states. The cam follower has half the number of lobes as the cam, so in a stable state, all cam followers either rest in notches or slots, depending on the state of the locking firearm holder.

The exemplary embodiment also includes another cam (hereinafter referred to as the "capture lever cam") which moves the capture lever to the unlock or lock position. The position of the capture lever cam follower is entirely dependent upon the position of the stator cam follower in the stator cam. To start with, for example (without loss of generality), assume that the stator cam follower is in a notch—which would correspond to the capture lever cam follower at the beginning of the capture lever cam. When the stator cam follower then switches to the other lobe of the stator cam and falls in a slot, the capture lever cam follower is dragged across the capture lever cam, moving the capture lever away from the locking firearm holder centerline which, acting through a pivot, moves the capture lever to lock.

The exemplary embodiment uses a further cam (hereinafter referred to as the slider cam) to switch between the lobes of the stator cam. This slider cam and its cam follower have the same number of lobes as the stator cam. However, the lobes are phased slightly differently so that the slider cam will advance the rotor (which integrally incorporates both the stator cam follower and the slider cam follower) just enough to place the rotor's stator cam follower over the next lobe of the stator cam.

The exemplary locking firearm holder is arranged such that the locked position corresponds to an extreme of the travel limit in the direction of the gun. Furthermore, the exemplary locking firearm holder is arranged such that the forces retaining the firearm substantially bypass the more delicate cams and bear on the more robust structural elements of the locking firearm holder.

The exemplary locking firearm holder of the type described above incorporates a "withdrawal limiter" which in the illustrated embodiment is a type of pin that bears on the rotor. The withdrawal limiter will completely withdraw from a slider motion limit slot when the rotor is in the locked position, for example when its stator cam follower is in the slot. However, when it is at rest in the notch, the pin is forced into the slider motion limit slot, limiting the travel of the slider to prevent an external force from dragging the slider toward the gun (firearm) and prematurely causing the capture lever to go to the lock state (by allowing the "jaws" to close prematurely).

The exemplary locking firearm holder of the type described above is mounted by use of a single slotted mounting arm which is rigidly attached to the stator, which in one embodiment comprises a tube holding the stator cam and capture lever cam.

STATEMENT REGARDING FEDERALLY SPONSORED RESEARCH OR DEVELOPMENT

None.

BACKGROUND

Some of the conventional methods of transporting a firearm in a vehicle include the following:
(a) Keeping the firearm on the person. This is a dangerous practice and subjects the person to risk of severe injury in case of a crash. It also limits access. The typical person must wiggle around and even release the seat belt to have a chance of drawing the weapon. With the technology disclosed herein, the firearm is securely held away from the user; however, to access the firearm, the user need only reach out his hand and push.
(b) Stuffing the firearm between the seat cushions. This dangerous practice is surprisingly common. It risks accidental discharge and creates a potential flying object in the case of a crash.
(c) Placing the firearm in the glove compartment. While generally safe, it renders the firearm almost inaccessible in an emergency.
(d) Many of the previously patented methods of securing a firearm rely on features which are not present in many automobiles. Several of them require a person to take their eyes off the situation. Also, some of these methods require fine motor skills. In a situation of extreme stress where a gun owner may feel required to be ready to use a weapon, fine motor skills quickly deteriorate. Best success is attained by persons using large motor skills and familiar motions, which the locking firearm holder disclosed herein allows.

SUMMARY

Accordingly, it is an advantage to provide a locking firearm holder that gives the user a convenient, accessible place to store a firearm when it is not safe or convenient to conceal it on their person, for example, when driving a car.

It is another advantage to provide a locking firearm holder having a very secure grip on the captured firearm. Because of the absolute motion limit, which bypasses the more delicate parts of the holder (such as the cams), it is easy to design a product according to the principles of the technology disclosed herein which requires more strength than normal people possess to force the firearm from the grip of the locking firearm holder.

It is yet another advantage to provide a locking firearm holder that prevents inadvertent actuation of the lock, for example, by snagging the sleeve on the capture lever while the gun is being drawn from the unlocked locking firearm holder. In a different design, the force of the snagged sleeve could draw the slider forward and activate a capture lever closing. However, in the locking firearm holder disclosed herein, the withdrawal limiter protrudes into the slider motion limit slot, and prevents or limits slider motion when the rotor is in the unlocked position, thus preventing inadvertent closing of the capture lever.

It is still another advantage to provide a locking firearm holder having ease and flexibility of mounting in a vehicle. Thanks to the slotted mounting arm, the locking firearm holder can be adjusted in height, closeness to the user, and pitch angle. Thus the user can customize the position of the locking firearm holder for most convenient use. For example, the locking firearm holder can be operated blindfolded.

It is a further advantage to provide a locking firearm holder having the ability to handle a wide variety of firearms without needing a wide variety of models of the locking firearm holder itself; the overwhelming majority of firearms can be accommodated with a few built-in adjustments.

It is yet a further advantage to provide a locking firearm holder that includes a small shock absorber, to prevent accidental actuation of the firearm releasing cams due to a sharp vibration or shock to the vehicle to which the locking firearm holder is mounted.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a locking firearm holder is provided, which comprises: (a) a capture lever that is movable between a capture lever unlock state and a capture lever lock state, the capture lever including comprising two portions that move away from one another to create the capture lever unlock state, and that move toward one another to create the capture lever lock state, the capture lever having at least one protrusion that extends from at least one of a first capture lever and a second capture lever to create a physical barrier to prevent withdrawal of the firearm when the in the capture lever lock state; (b) a first cam having an even number of first lobes, each first lobe terminating in one of: (i) a notch, and (ii) a slot; (c) a biased first cam follower having a plurality of second lobes, the second lobes of the first cam follower having two possible stable states: (i) the capture lever unlock state and (ii) the capture lever lock state, such that if the cam follower is in a stable state, the second lobes are resting either in the notch or the slot, of one of the first lobes; (d) a second cam having a plurality of third lobes; (e) a biased second cam follower that moves against the third lobes; (f) a third cam having at least one fourth lobe; (g) a biased third cam follower that moves against the at least one fourth lobe, wherein a position of the third cam follower depends upon a position of the second lobes of the first cam follower, wherein: (i) if the second lobes are in one of the notch and the slot, then the third cam follower is forced to move into one of a first position and a second position, and (ii) if the second lobes are in the other one of the notch and the slot, then the third cam follower is forced to move into the other one of the first position and the second position; (iii) if the third cam follower is in the first position, then the capture lever is forced into the unlock capture lever state; (iv) if the third cam follower is in the second position, then the capture lever is forced into the lock capture lever state; and (h) a rotor that includes both the first cam follower and the second cam follower so that they move together; (i) wherein: the plurality of third lobes are phased slightly differently so that the second cam, if actuated, will sufficiently advance the rotor to place the first cam follower over the next first lobe of the first cam.

In accordance with another aspect, a locking firearm holder is provided, which comprises: (a) a capture lever that is movable between a capture lever unlock state and a capture lever lock state, the capture lever including a first capture lever and a second capture lever that move away from one another to create the capture lever unlock state, and that move toward one another to create the capture lever lock state, the capture lever having at least one protrusion that extends from at least one of the first capture lever and the second capture lever to create a physical barrier which prevents withdrawal of the firearm when in the capture lever lock state; (b) a capture lever that can exist in only two possible stable mechanical states, a first stable state and a second stable state; (c) a slider that displaces when pushed by user actuation, and, when so actuated, the slider forces the first capture lever to change states; (d) a rotary cam and cam follower of variable length, wherein: (i) if the capture lever is in the first stable state, then the rotary forces the capture lever to the capture lever unlock state; (ii) if the capture lever is in the second stable state, then the rotary cam forces the capture lever to the capture lever lock state; and (e) a withdrawal limiter that is biased against the slider; (f) wherein: if the capture lever is being forced into the capture lever unlock state, then the withdrawal limiter physically interferes with a motion of at least one of the slider and the rotary cam, to prevent premature movement of the capture lever into the lock state.

In accordance with yet another aspect, a locking firearm holder is provided, which comprises: (a) a capture lever that is movable between a capture lever unlock state and a capture lever lock state, the capture lever including a first capture lever and a second capture lever that move away from one another to create the capture lever unlock state, and that move toward one another to create the capture lever lock state, the capture lever having at least one protrusion that extends from at least one of the first capture lever and the second capture lever to create a physical barrier to the withdrawal of the firearm when the in the capture lever lock state; (b) a capture lever that can exist in only two possible stable mechanical states, a first stable state and a second stable state; (c) a slider that displaces when pushed by user actuation such that, when so actuated, the slider forces the capture lever to change states; and (d) a rotary cam and cam follower of variable length, wherein: (i) if the capture lever is in the first stable state, then the rotary cam forces the capture lever to the capture lever unlock state; (ii) if the capture lever is in the second stable state, then the rotary cam forces the capture lever to the capture lever lock state; (e) wherein: (i) if a user pushes a firearm against the slider while the capture lever is in the capture lever unlock state, then the first capture lever and the second capture lever will move toward one another, into the capture lever lock state, and the protrusion or protrusions will move into a position so as to capture the firearm; and (ii) if a user pushes a firearm against the slider while the capture lever is in the capture lever lock state, then the first capture lever and the second capture lever will move away from one another, into the capture lever unlock state, and the protrusion or protrusions will move into a position so as to release the firearm.

In accordance with still another aspect, a locking firearm holder is provided, which comprises: (a) a receiving portion, having: (i) a movable firearm receiver that moves along a first axis, the firearm receiver forming a partial enclosure having an opening, and with a distal portion; (ii) a pivotable lever that has at least one protrusion that extends at an angle that is approximately perpendicular to the first axis; wherein: (iii) the locking firearm holder enters into a lock state if the lever is moved such that the at least one protrusion is moved toward the distal portion of the firearm receiver, and (iv) the locking firearm holder enters into an unlock state if the lever is moved such that the at least one protrusion is moved away from the distal portion of the firearm receiver; (b) a first cam having a plurality of first lobes; (c) a biased first cam follower having a plurality of second lobes that moves against the plurality of first lobes, wherein with respect to contacting the plurality of first lobes, the second lobes of the first cam follower have only a possible first stable state and a possible second stable state; (d) a second cam having a plurality of third lobes; (e) a biased second cam follower that moves against the plurality of third lobes; (f) a third cam having at least one fourth lobe; (g) a biased third cam follower that moves against the at least one fourth lobe, wherein a position of the third cam follower depends upon a position of the plurality of second lobes of the first cam follower, wherein: (i) if the plurality of second lobes are in one of the possible first stable state and the possible second stable state, then the third cam follower is forced to move into one of a first position and a second position, and (ii) if the plurality of second lobes are in the other one of the possible first stable state and the possible second stable state, then the third cam follower is forced to move into the other one of the first position and the second position; (iii) if the third cam follower is in the first position, then the pivotable lever and the at least one protrusion are forced to move into the unlock state; and (iv) if the third cam follower is in the second position, then the pivotable lever and the at least one protrusion are forced to move into the lock state; and (h) a rotor that includes both the first cam follower and the second cam follower so that they move together; (i) wherein: the plurality of third lobes are phased slightly differently so that the second cam, if actuated, will sufficiently advance the rotor to place the first cam follower over the next of the plurality of first lobes of the first cam.

In accordance with a further aspect, a locking firearm holder is provided, which comprises: (a) a receiving portion, having: (i) a movable firearm receiver that moves along a first axis, the firearm receiver forming a partial enclosure having an opening, and with a distal portion; (ii) a pivotable lever that has at least one protrusion that extends at an angle that is approximately perpendicular to the first axis; wherein: (iii) the locking firearm holder enters into a lock state if the lever is moved such that the at least one protrusion is moved toward the distal portion of the firearm receiver, and (iv) the locking firearm holder enters into an unlock state if the lever is moved such that the at least one protrusion is moved away from the distal portion of the firearm receiver; (b) a first lock portion that can exist in only two possible stable mechanical states, a first stable state and a second stable state; (c) a second lock portion that displaces if the movable firearm receiver is pushed by user actuation, and, when so actuated, the second lock portion forces the first lock portion to change states; (d) a third lock portion, wherein: (i) if the first lock portion is in the first stable state, then the third lock portion forces the pivotable lever and the at least one protrusion to move toward the distal portion of the firearm receiver; (ii) if the first lock portion is in the second stable state, then the third lock portion forces the pivotable lever and the at least one protrusion to move away from the distal portion of the firearm receiver; and (e) a withdrawal limiter that is biased against the second lock portion; (f) wherein: if the locking firearm holder is being forced into the unlock state, then the withdrawal limiter physically interferes with a motion of at least one of the second lock portion and the third lock portion, to prevent premature displacement of the at least one protrusion toward the distal portion of the firearm receiver.

In accordance with a yet further aspect, a locking firearm holder is provided, which comprises: (a) a receiving portion, having: (i) a movable firearm receiver that moves along a first axis, the firearm receiver forming a partial enclosure having an opening, the opening being sized and shaped to receive a portion of a firearm, the partial enclosure including at least one wall to form the opening, and the at least one wall having a distal portion; (ii) a pivotable lever that has at least one protrusion that extends at an angle that is approximately perpendicular to the first axis; wherein: (iii) the locking firearm holder enters into a lock state if the lever is moved such that the at least one protrusion is moved toward the distal portion of the firearm receiver, and (iv) the locking firearm holder enters into an unlock state if the lever is moved such that the at least one protrusion is moved away from the distal portion of the firearm receiver; (b) a first lock portion that can exist in only two possible stable mechanical states, a first stable state and a second stable state; (c) a second lock portion that displaces if the movable firearm receiver is pushed by user actuation, and, when so actuated, the second lock portion forces the first lock portion to change states; and (d) a third lock portion, wherein: (i) if the first lock portion is in the first stable state, then the third lock portion forces the pivotable lever and the at least one protrusion to move toward the distal portion of the firearm receiver; (ii) if the first lock portion is in the second stable state, then the third lock portion forces the pivotable lever and the at least one protrusion to move away from the distal portion of the firearm receiver.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
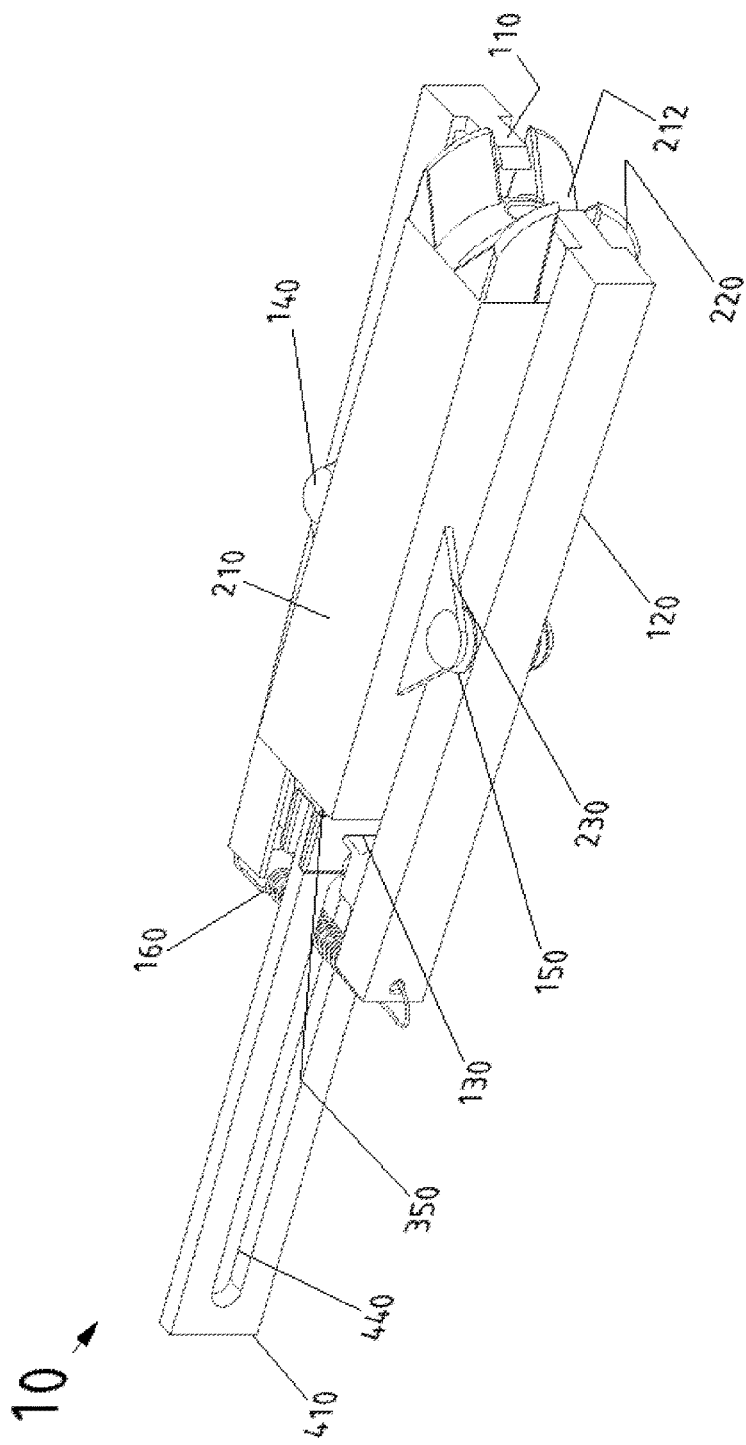
FIG. 1 is a perspective view of a first embodiment locking firearm holder, as constructed according to the principles of the technology disclosed herein, as depicted in the locking firearm holder's "receiving state."

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The terms "first" and "second" preceding an element name, e.g., first inlet, second inlet, etc., are used for identification purposes to distinguish between similar or related elements, results or concepts, and are not intended to necessarily imply order, nor are the terms "first" and "second" intended to preclude the inclusion of additional similar or related elements, results or concepts, unless otherwise indicated.

First Embodiment

Receiving State

Referring now to FIG. 1, a locking firearm holder 10 is depicted in its receiving state. A pair of capture lever protrusions 110 is illustrated in their unlocked ("open") position—these protrusions 110 act much as a "jaws" to either capture, or to not capture, a firearm. There is a pair of capture levers 120 (sometimes also referred to as "jaw arms") such that each capture lever 120 can rotate on pivots 140, which have pivot bearings 150, and are mounted in pivot supports 230. A third cam follower 130 (also referred to herein as a "capture lever cam follower" 130) is held in contact with a third cam 350 (also referred to herein as a "capture lever cam" 350) by a capture lever spring 160. Note that the capture lever cam follower 130 is positioned on the capture lever cam 350 (see FIG. 3), and thus holds the capture lever pair of protrusions 110 in the unlock ("open" or non-capture) state.

The capture lever pair 120, capture lever protrusions 110, and their associated pivoting parts (e.g., the pivot bearings 150, etc.) make up an overall capture lever assembly that essentially has a first capture lever (as a "first jaw half") and a second capture lever (as a "second jaw half") which either unlocks to receive a firearm or locks to hold a firearm in place, once captured. The first and second capture levers mainly comprise the capture lever pair 120 and the capture lever protrusions 110.

It will be understood that the capture lever protrusions 110 basically can comprise any type of protrusion that extends from at least one of the first and second capture levers 120 to create a "physical barrier to withdrawal of the firearm" when in the "capture lever lock state." In other words, the capture lever protrusions 110 can either comprise a pair of extensions (i.e., one extension protruding from each of the pair of capture levers 120) that essentially meet one another when the capture lever pair enters the capture lever lock state, or the capture lever protrusions 110 can comprise a single extension that protrudes from only one of the pair of capture levers 120 and which extends substantially all the way to the other (opposite member) of the capture lever pair 120, in which the other (opposite member) of the capture lever pair does not exhibit a protrusion. Another way of stating this principle is that there is at least one protrusion 110 extending from at least one of the capture levers 120.

A slider 210 is attached to a slider end cap 220 (also referred to herein as a "firearm receiver"), which is ready to accept a hand gun trigger guard (not shown in FIG. 1) in a groove 212. Also shown is a mounting arm 410 having a mounting adjustment slot 440. In conjunction with other hardware not shown, this is used for mounting the locking firearm holder 10 to some stable substrate, such as an automobile. The mounting adjustment slot 440 will permit a user to adjust the angle, elevation, and distance of the locking firearm holder 10 relative to the position of the user, for the convenience of the user.

It will be understood that, as used herein, the terms "jaw" and "jaws" typically refer to the same parts, either as a pair of jaws (in the singular), or a single jaw half (also in the singular). In general, the word "jaws" will be used, whether the entire structure (i.e., both jaw halves) is being referred to, or whether only a portion (e.g., a single jaw half) of the entire structure is being referred to, especially if a statement is being made about an item causing the "jaws" to open or close, for example.

It will be further understood that, as used herein, the terms "capture lever," "capture levers," and "capture lever pair") typically refer to the same parts, either as a pair of capture levers (in the singular), or a single capture lever (also in the singular), or as part of a capture lever cam subassembly that happens to interact with either a single component (such as only one capture lever), or with the entire capture lever assembly—which is still a single structure. In some instance, the phrase "at least one capture lever" will be used, whether the entire structure (i.e., both capture levers) is being referred to, or whether only a portion (e.g., a single capture lever) of the entire structure is being referred to, especially if a statement is being made about an item causing the "capture lever(s)" to open or close, for example. On the other hand, items such as the capture lever cam or the capture lever cam follower will typically use the word "lever," rather than "levers," regardless of how that item reacts with the remainder of the firearm holder.

General Parts Exploded View

Figure 2:
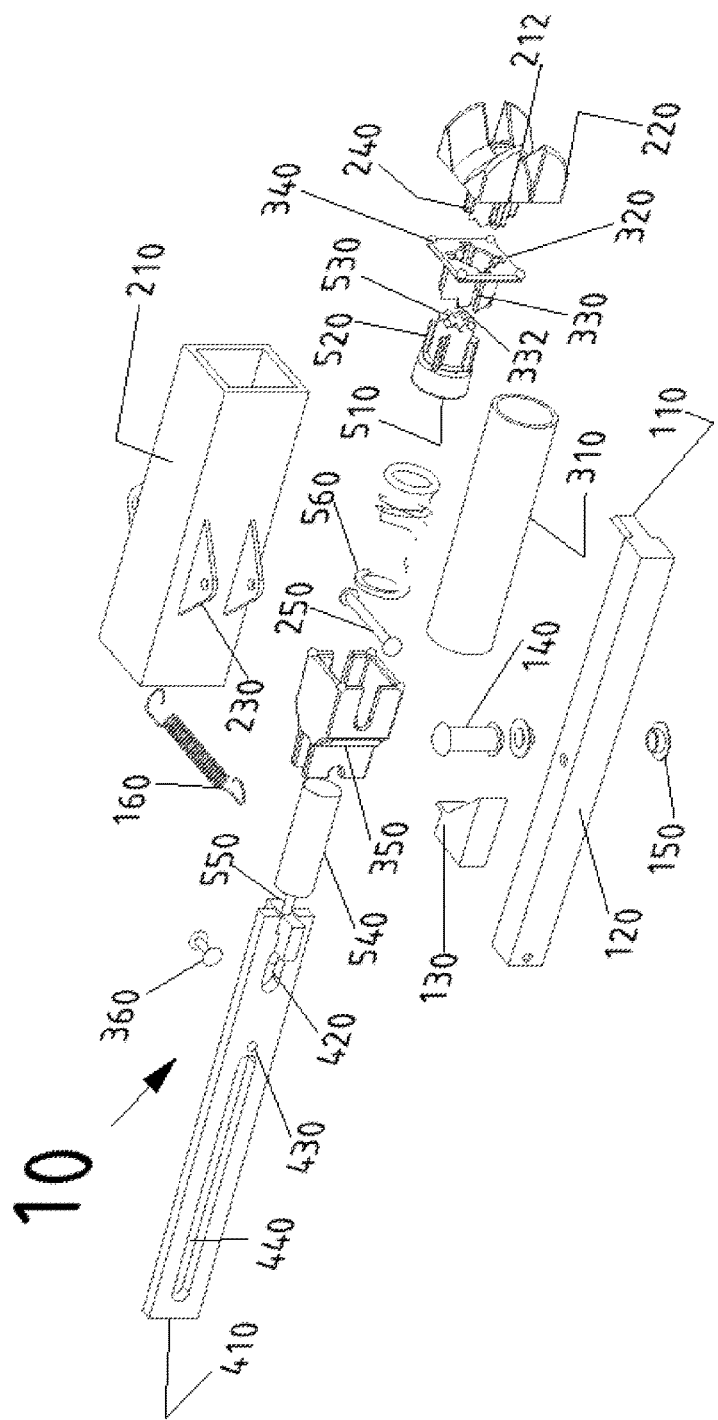
FIG. 2 is an exploded view of most of the major components of the locking firearm holder of FIG. 1.

FIG. 2 is an exploded view of many of the parts that make up the locking firearm holder 10. When emplaced in the locking firearm holder 10, a hand gun (not shown in this view) can be retained by the two capture lever protrusions 110, which trap the trigger guard 620 of the hand gun 610 (see FIG. 4) between the capture lever protrusions 110 and the end cap 220 of the slider 210. In this embodiment, the capture lever protrusions 110 extend from each of the capture levers 120, which can rotate on a pivot 140 (as a type of "jaws"). The protrusion 110 is located proximal to a distal end of the capture lever 120 in which, on this view of FIG. 2, the distal end is to the right. The pivot is supported on bearings 150, which reduce friction. At the far end of the capture lever 120 is the capture lever cam follower 130 which rides on the capture lever cam 350. The capture lever spring 160 holds the capture lever cam follower 130 in contact with the capture lever cam 350. A capture lever cam retaining fastener 360 holds the capture lever cam 350 in place.

The pivot 140 is attached to the slider 210 at the slider capture lever pivot support 230. The slider 210 and all other items attached to it slide relative to the stator 310 and all other items attached thereto. There are eight stator/slider bearings 340, which facilitate the sliding motion of the slider 210 relative to the stator 310.

Items attached to the slider 210 include the slider end cap 220, the slider capture lever pivot support 230, a second cam 240 (also referred to herein as a "slider cam" 240), a slider limit screw 250, the capture lever protrusions 110, the capture lever 120, the capture lever cam follower 130, the pivots 140, the bearings 150, and the capture lever spring 160. Items attached to the stator 310 include a first cam 320 (also referred to herein as a "stator cam" 320), which is an outer rotary cam with slots 330 and notches 332, the eight stator/slider bearings 340, the capture lever cam 350, and the mounting arm 410 (which has a slider motion limit slot 420), a capture lever cam mounting hole 430, and the mounting adjustment slot 440.

Inside the stator 310 is a rotor 510. Integral to the rotor are two cam followers: a first cam follower 520 (also referred to herein as a "stator cam follower" 520), which rides on the stator cam 320, and a second cam follower 530 (also referred to herein as a "slider cam follower" 530), which rides on the second cam (i.e., the slider cam) 240. The slider cam 240 is an integral part of the slider end cap 220. A rotor spring 560 urges the rotor 510 toward the slider end cap 220, and holds the rotor 510 in contact with the stator cam 320 and/or the slider cam 530. Thus, the rotor spring 560 biases both the first cam follower 520 and the second cam follower 530 against their respective first and second cams 320 and 240. A rotor spring shaft 540 fits inside the rotor spring 560 and supports a small part referred to herein as a "withdrawal limiter" 550.

Two types of relative motion take place in this locking firearm holder 10. The first motion is along the longitudinal axis of the locking firearm holder 10. During insertion, when the user places the gun's trigger guard 620 (see FIG. 4) in the slider end cap 220 groove 212 and pushes, all items attached to the slider 210 then slide away from the user. Thereafter, when the user releases the gun, the rotor spring 560 pushes the slider assembly toward the user. Absolute limits on this motion are set by the slider motion limit slot 420, but the rotor 510 influences how far back toward the user the slider 210 is able to slide. It does so by virtue of the second form of relative motion in the locking firearm holder 10, i.e., rotation of the rotor 510. The rotor 510 has two different rotary cam followers: the stator cam follower 520 and the slider cam follower 530. There are two types of stator cam lobes, which alternate around the stator cam 320; one terminates in a notch 322 and the other in a slot 330. The slot 330 allows the rotor 510 (and thus the slider 210) to move closer to the user, thus closing the capture lever protrusions 110 (see FIG. 8).

The slider cam 240 plays a key role in the capture lever protrusions 110 alternating between unlock and lock states. When the stator cam follower 520 reaches the end of the current lobe of the stator cam 320, the notch 322 or slot 330 restrains it from further rotation. However, when the user pushes on the slider 210, the rotor 510 is pushed out of contact with the stator cam 320 (see FIG. 5). The slider cam 240 now controls relative motion and, under the influence of the pressure between the slider cam and rotor, forces a small rotation of the rotor 510 which causes the rotor stator cam follower 520 to line up on the next lobe of the stator cam 320. Thus each individual push on the slider end cap 220 moves the locking firearm holder between two states: capture lever unlock (i.e., "jaws" open) and capture lever lock (i.e., "jaws" closed).

Receiving State—Continued

Figure 3:
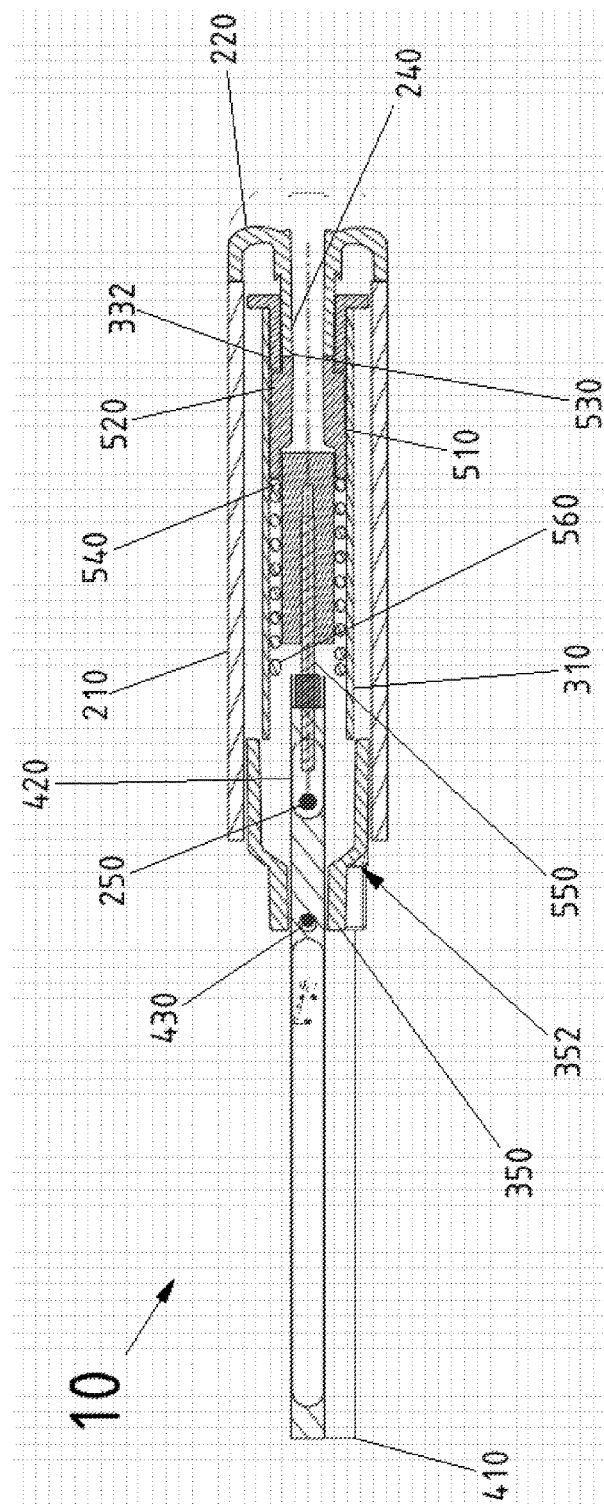
FIG. 3 is a cross-section view of the main operating locking firearm holder for implementing the unlock and lock states of the locking firearm holder of FIG. 1, as depicted in the locking firearm holder's "receiving state."

Assuming a plane passing through the axis of the locking firearm holder 10 and the middle of the capture lever pair 120 to be horizontal, then FIG. 3 illustrates a cross-sectional plane that is oriented at 45 degrees with respect to the horizontal, which better illustrates the stator cam followers 520 resting on the stator cam notches 332. This portrays the fundamental constraint on how far forward the capture lever cam followers 130 can go along the capture lever cam 350, which is what keeps the capture lever unlocked. (See FIG. 1.)

FIG. 3 shows a hole 430 in the mounting arm 410; this hole 430 retains the capture lever cam 350. A slider motion limit slot 420 puts an absolute limit on how far the slider 210 can slide relative to the stator 310. The slider limit screw 250, which is rigidly attached to the slider 210, is trapped in this slot 420. Note that withdrawal limiter 550 penetrates into the slider motion limit slot 420 and forms an additional limit, which prevents the slider 210 from being manually pulled back. As a hypothetical example, the capture lever protrusion 110 might otherwise snag the user's sleeve and cause the capture lever to prematurely "close" and lock while the user is withdrawing the gun; however, withdrawal limiter 550 arrests the motion of the slider 210 and thereby prevents that snagging situation from occurring. The withdrawal limiter 550 is held by the rotor spring shaft 540 which sits inside the rotor spring 560. The rotor spring 560 provides the force to move the rotor 510. As discussed above, the rotor 510 includes two cam followers: the stator cam follower 520 (which is shown resting on the stator cam 320, specifically in the notch 332 of the cam) and the slider cam follower 530 (which is shown in contact with the slider cam 240). The slider cam 240 is a part of the slider end cap 220 (the firearm receiver).

Inserting State

Figure 4:
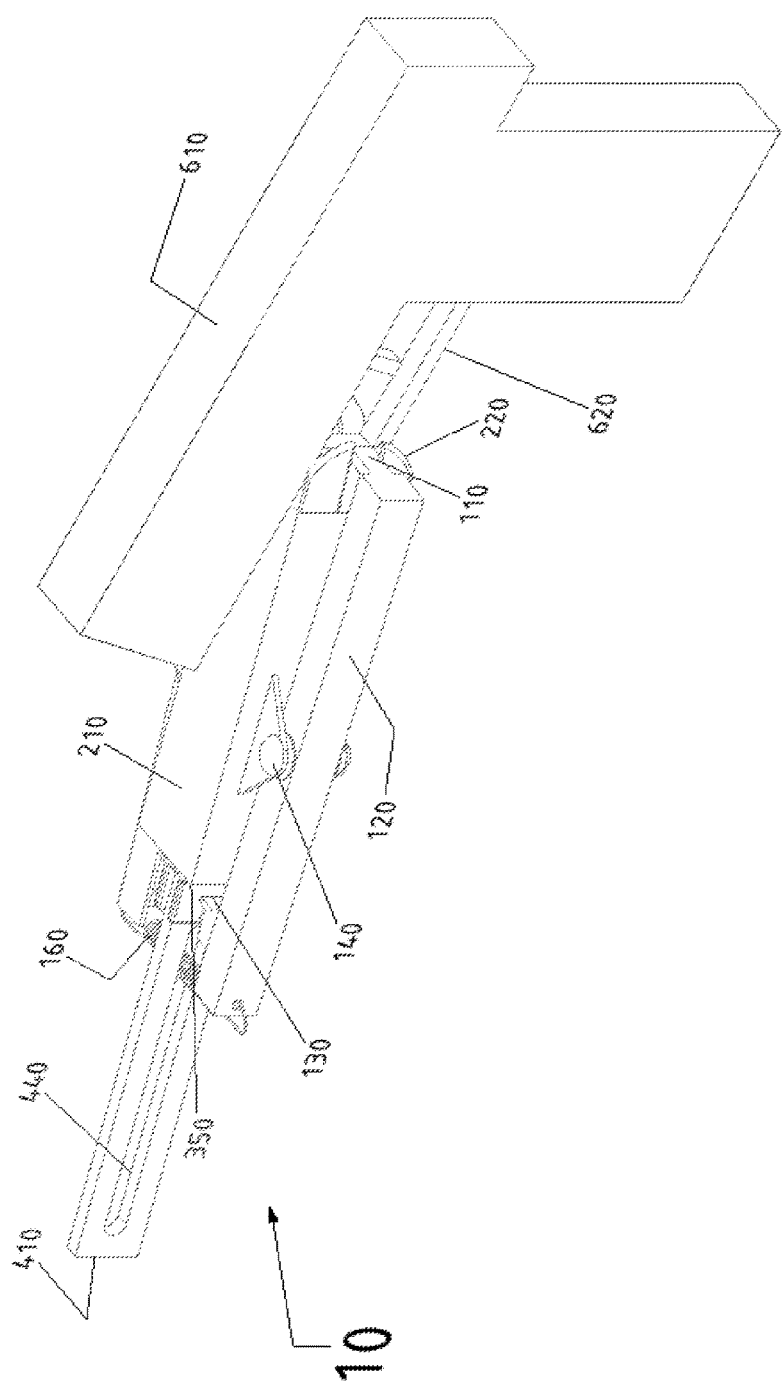
FIG. 4 is a perspective view of the locking firearm holder of FIG. 1, as depicted in the locking firearm holder's "inserting state," showing a hand gun being placed into the slot area between the capture lever pair.

Referring now to FIG. 4, the user has pushed a hand gun 610 and its trigger guard 620 into the locking firearm holder 10. The capture lever protrusions 110 are unlocked in this view and the slider 210 and its end cap 220 are pushed back relative to the mounting arm 410 and its mounting slot 420. This can be seen by comparing the position of the capture lever cam follower 130 to the capture lever cam 350 for the Inserting State of this FIG. 4 versus the Locking State of FIG. 8. The capture lever spring 160 holds the capture lever cam follower 130 in contact with the capture lever cam 350. Since the pivot 140 allows for rotation of the capture lever when the capture lever cam follower 130 is in position closest to the mounting arm 410, the capture lever 110 is unlocked.

Figure 5:
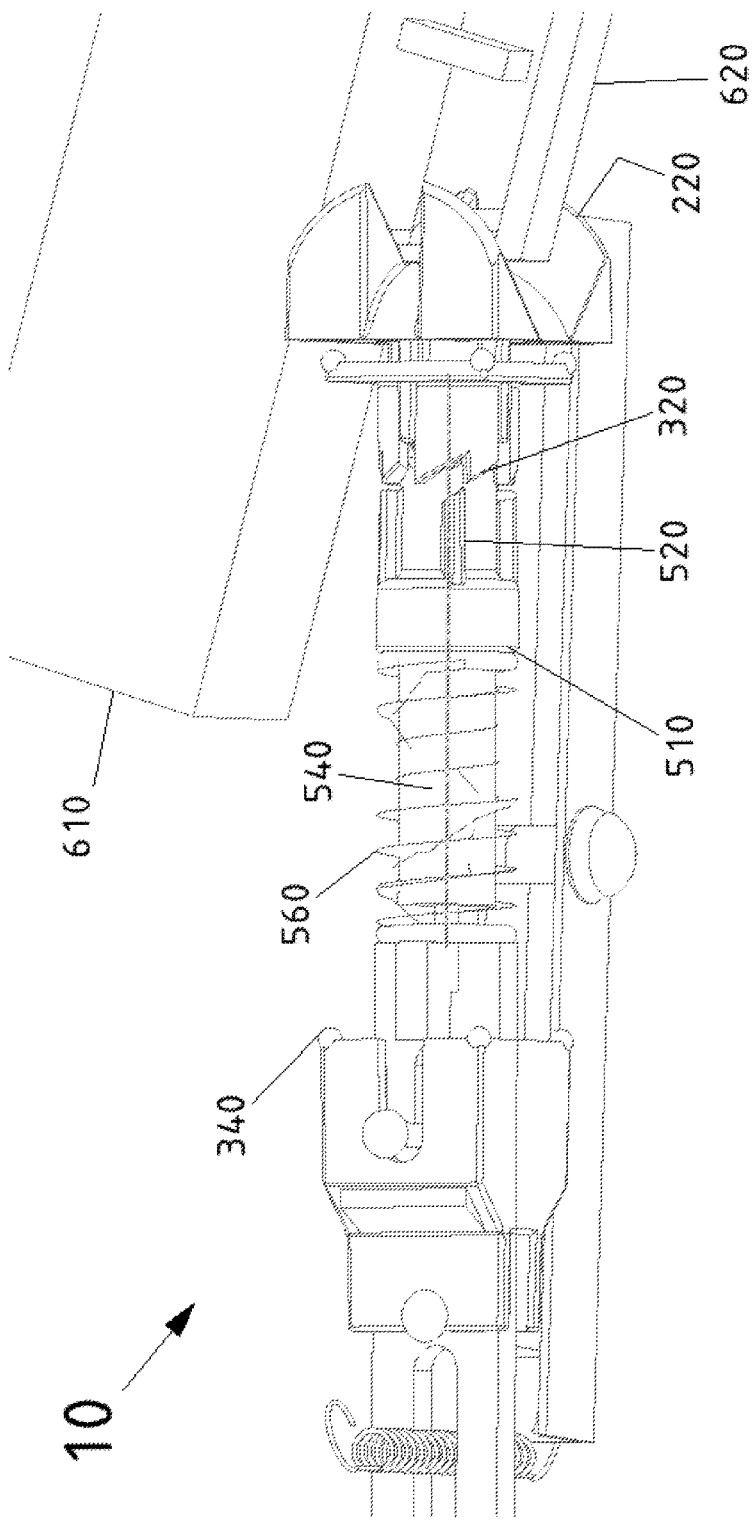
FIG. 5 is a side elevational view, partly from below, of the main operating parts of the locking firearm holder of FIG. 1, showing a hand gun pressing against the slider end cap as the gun is about to be captured, during the locking firearm holder's "inserting state." (Some outer parts are removed to reveal hidden inner parts.)

FIG. 5 is a cut-away view that has removed the slider, stator, and one capture lever to give a clear view of the interior of the locking firearm holder 10. This view of FIG. 5 shows the trigger guard 620 of the gun 610 pressing against the slider end cap 220, which compresses the rotor spring 560, thereby moving the rotor 510 back, as well as the rotor spring shaft 540. This view of FIG. 5 also shows several of the bearings 340 that facilitate sliding of the slider 210 (which is not shown in this view). Note the relation of the stator cam follower 520 and the stator cam 320: the stator cam follower 520 has withdrawn from the stator cam 320 (i.e., the stator cam follower releases contact from the stator cam), which no longer has any influence on any rotation of the rotor 510. Once the locking firearm holder 10 has reached this state it will be able to rapidly transition to its Releasing State.

Figure 6:
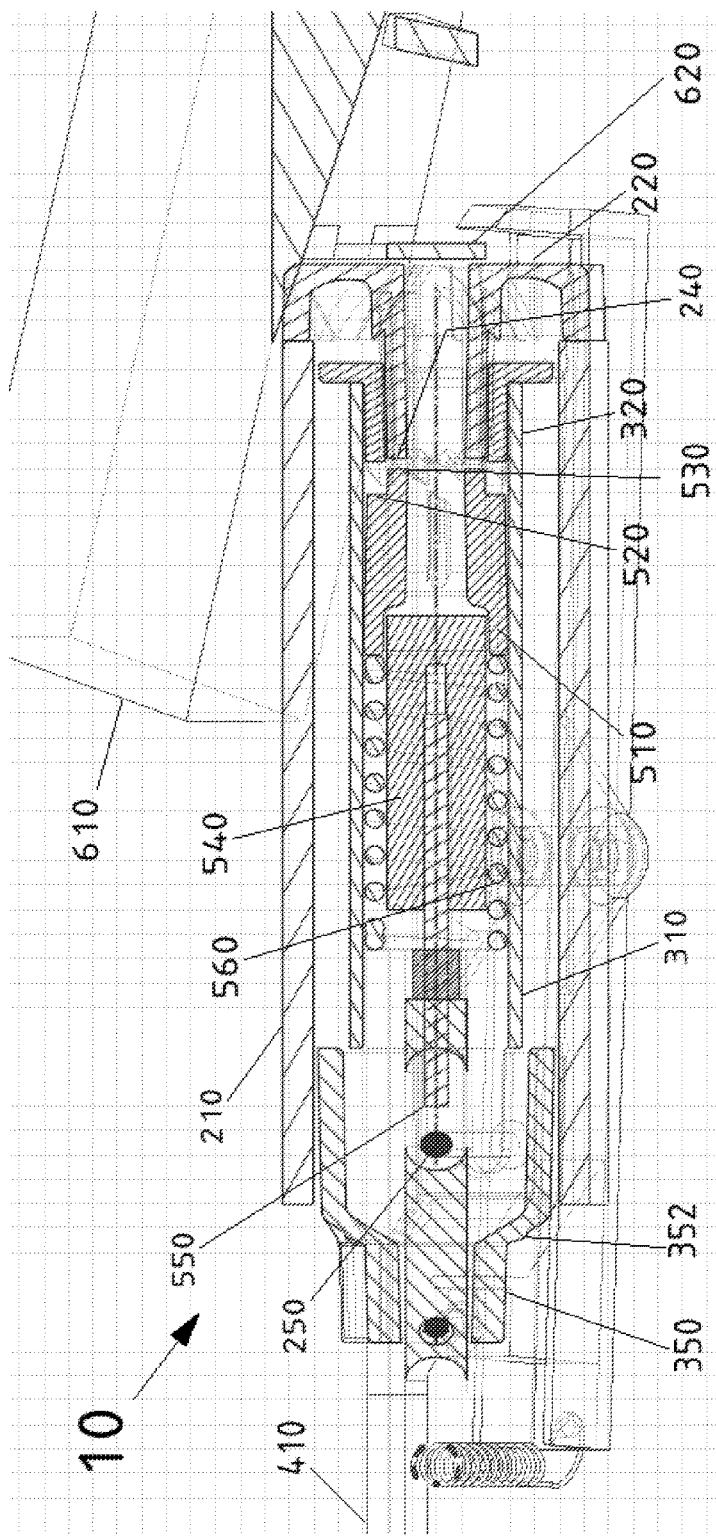
FIG. 6 is a cross-section view of the main operating parts of the locking firearm holder of FIG. 1, as depicted in the locking firearm holder's "inserting state."

FIG. 6 is a cross-section view of the Insertion State, in which the trigger guard 620 of the hand gun 610 presses against the end cap 220 of the slider 210. The rotor 510 is being pushed back by the slider cam 240 pushing on the slider cam follower 530. The rotor is just at the point where it has lifted the stator cam follower 520 away from the stator cam 320. The rotor 510 has also compressed the rotor spring 560 and has pushed back the rotor spring shaft 540, which in turn has pushed back the withdrawal limiter 550, confining the slider limit screw 250. Also visible are the capture lever cams 350 (with their ramp style lobe 352, upon which the capture lever cam followers move), the stator/slider bearings 340, and the stator tube 310, which confines the rotor and its related pieces and also locates the stator cam 320. The stator tube 310 is like a pipe. The rotor 510, rotor spring 560, rotor shaft 540, and withdrawal limiter 550 are simply loaded into this "pipe" and otherwise unattached. They are passively captured between the wall of the stator 310 (the pipe wall) and the mounting arm 410 at one end of the pipe and the stator cam 320 at the other. Because the stator tube 310 is rigid, it fixes the location of the elements attached to it.

It is significant to note that, as depicted in this view of FIG. 6, the slider cam 240 and the slider cam follower 530 are in contact, but are not in an equilibrium position. Now that the stator cam 320 and stator cam follower 520 are separated, the slider cam follower 530 is about to go to its equilibrium position, as (when required) the locking firearm holder transitions to its Releasing State.

Releasing State

Figure 7:
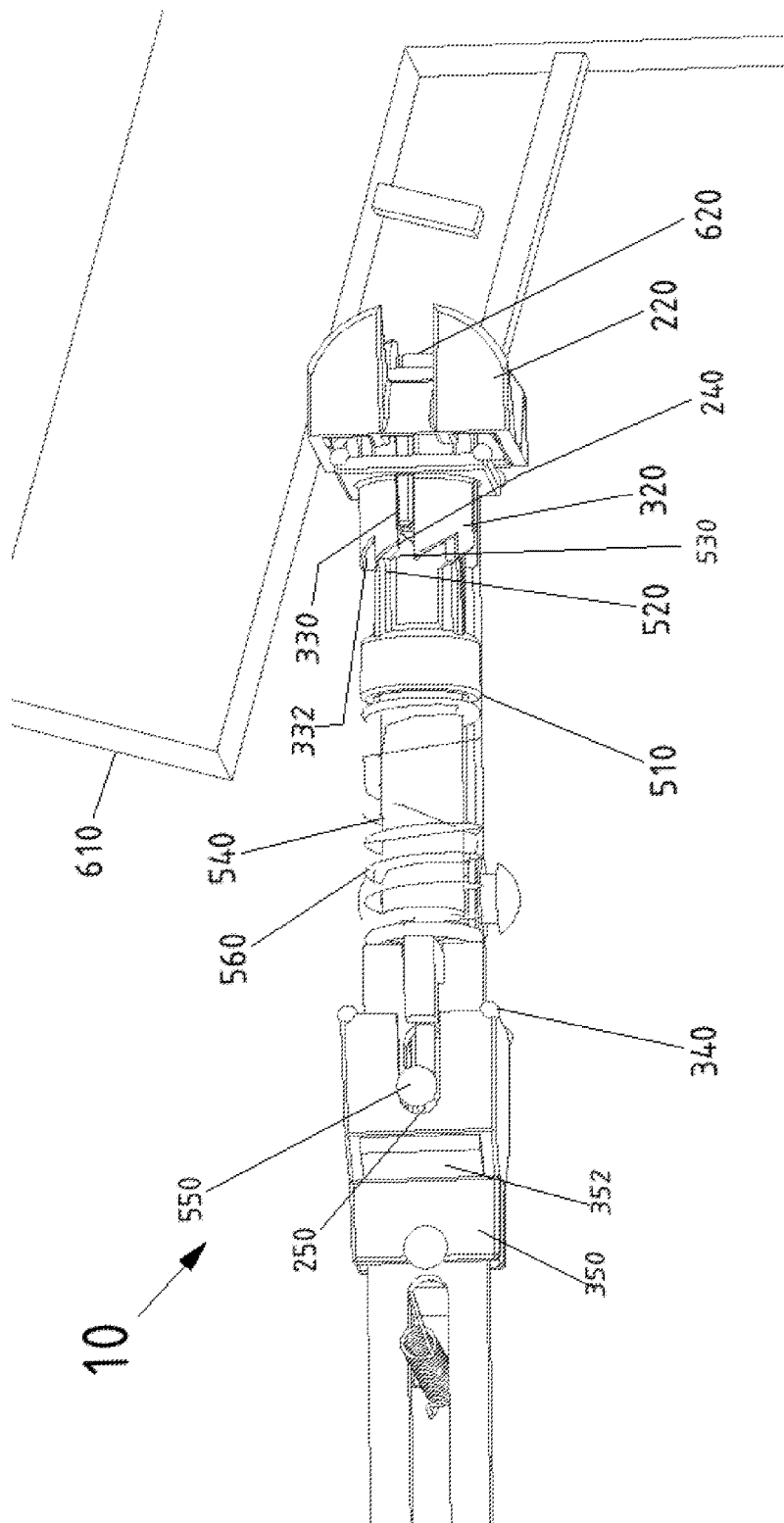
FIG. 7 is a side cut-away view of the main operating parts of the locking firearm holder of FIG. 1, with certain components having been removed to provide a clear view of the interior of the locking firearm holder in its "releasing state."

An external view of the Releasing State has the same appearance as that for the Inserting State, which is depicted in FIG. 4. However, FIG. 7 is a cut-away view that has removed the slider, stator, and one capture lever to give a clear view of the interior of the locking firearm holder 10 in its Releasing State. Once the hand gun 610 in contact with the end cap 220 with its trigger guard 620 has advanced far enough as it is being inserted, the stator cam follower 520 is released from the stator cam 320 and, under the influence of the slider cam 240, the slider cam follower 530 rotates the rotor 510 so that the stator cam follower 520 rotates to the stator cam lobe with the stator slot 330.

FIG. 7 also illustrates the capture lever cam 350, the slider limit screw 250, the slider/stator bearings 340, the rotor spring 560, the rotor spring shaft 540, and the withdrawal limiter 550. Once the Release State has been achieved, the user may remove his hand from the hand gun (see below, for the Locking State).

Referring again to FIG. 7, the eight cam lobes of the stator cam 320 are best seen: there are two types of lobes, with four lobes of each type. The first type of lobe terminates in a notch—which are the stator cam notches 332—while the second type of lobe terminates in a slot—which are the stator cam slots 330. These two types of cam lobes alternate around the circumference of the stator cam 320. The significance is that two stable states are defined: one of the stator cam followers 520 resting in one of the notches 332 and the other of the stator cam followers resting in one of the slots 330. The importance of this is that the rotor 510 advances significantly closer to the stator cam 320 when the follower 520 rests in a slot 330 rather than a notch 332. This is what causes the capture lever cam follower 130 to run up the capture lever cam 350 ramp 352 and thus swing the capture lever protrusions 110 locked (e.g., "jaws" closed).

The rotor 510 has four stator cam followers 520, which look like little fins on the sides of the thinner part of the rotor 510. The ends of these fins 520 are fabricated to closely match the surface of stator cam 320. Therefore, when the stator cam follower and the stator cam come in contact under pressure, the rotor's stator cam follower 520 will "follow" the stator cam 320, i.e., the stator cam follower 520 will rotate until something (a notch 332 or a slot 330) stops its progress. There the stator cam follower and thus the rotor (of which the stator cam follower is an integral part) will stay until the user applies counter-pressure to the slider end cap 220 to "slide" the rotor against the spring pressure.

Only when this pressure overcomes the rotor spring 560 and pushes the rotor 510 out of contact with the stator cam 320 does the second cam (the slider cam 240) come into operation. The slider cam interacts with the slider cam follower 530, which is an integral part of the rotor 510. Once the stator cam 320 can no longer prevent rotation, the slider cam 240 will rotate the rotor 510 by way of its slider cam follower 530. This rotation places and holds the rotor's stator cam follower 530 over the "next" cam lobe of the stator cam 320. Although it is not in contact with the stator cam 320, the rotor 510 is positioned such that the "next lobe" of the stator cam 320 is the one it will interact with when the operator relaxes the pressure on the slider end cap 220.

Locking State

Figure 8:
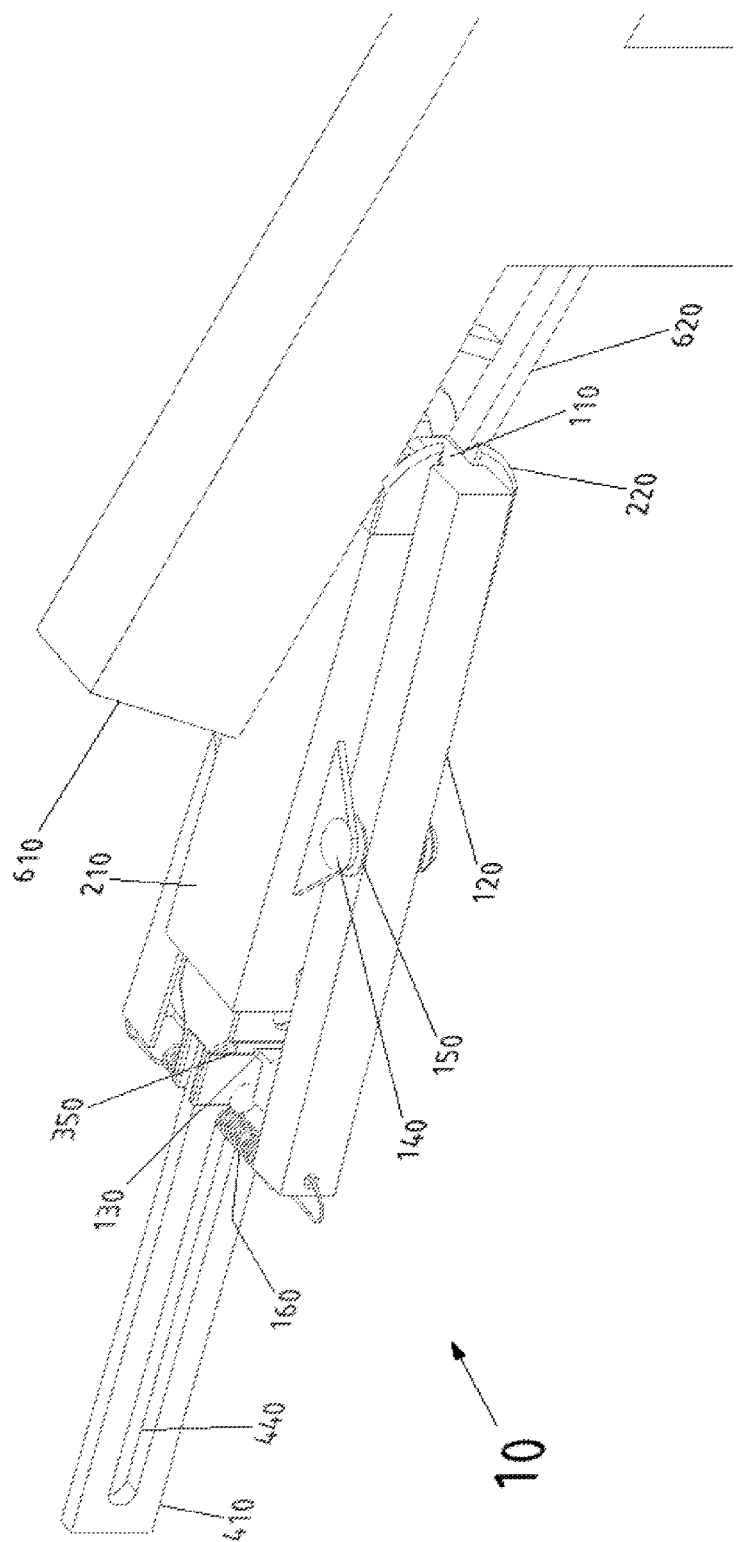
FIG. 8 is a perspective view of the locking firearm holder of FIG. 1, as depicted in the locking firearm holder's "locking state."

Immediately after the Release State, the user relaxes the pressure on the hand gun 610, which allows the rotor spring to push the slider 210 out to its maximum position. As seen in FIG. 8, this allows the capture lever cam follower 130 to ramp up the capture lever cam 350, which pushes the rear of the capture lever 120 away from the locking firearm holder 10 so that, in conjunction with the pivot 140, the capture lever protrusions 110 will approach each other, trapping the trigger guard 620 between the capture lever protrusions 110 and the slider end cap 220. FIG. 8 also illustrates the mounting arm 410, the mounting arm adjustment slot 440, the capture lever spring 160, and the bearings 150.

Figure 9:
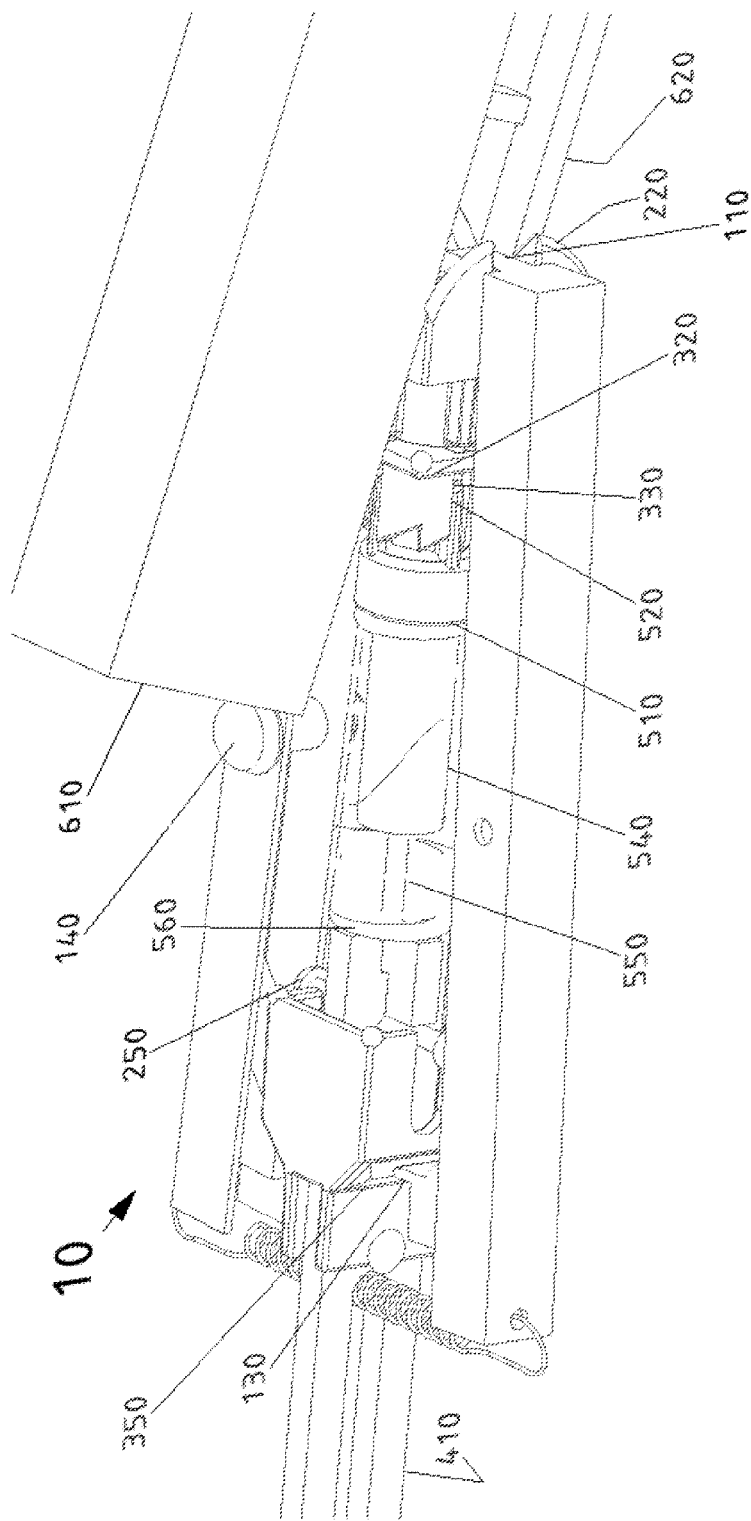
FIG. 9 is a side cut-away view of the main operating parts of the locking firearm holder of FIG. 1, with certain components having been removed to provide a clear view of the interior of the locking firearm holder in its "locking state."

FIG. 9 is a cut-away view showing the locking firearm holder 10 in its Locking State with the slider, stator tube, and one of the capture lever pair removed to give a clear view of the inside. The rotor 510 has advanced as far as it can due to the stator cam followers 520 entering the slots 330 in the stator cam 320. This has forced the slider out as far toward the gun as it can go. The slider limit screw 250 is now against its absolute travel limit stop. The withdrawal limiter 550 has withdrawn completely from the slot, pulled back by the rotor spring shaft 540. The slider spring 560 is extended to its limit. The capture lever 120 is mounted to the slider and so move as well, moving the capture lever cam follower 130 up the capture lever cam 350, swinging each capture lever 120 about the pivot 140, and trapping the trigger guard 620 of the hand gun 610 between the capture lever protrusions 110 and the slider end cap 220.

Figure 10:
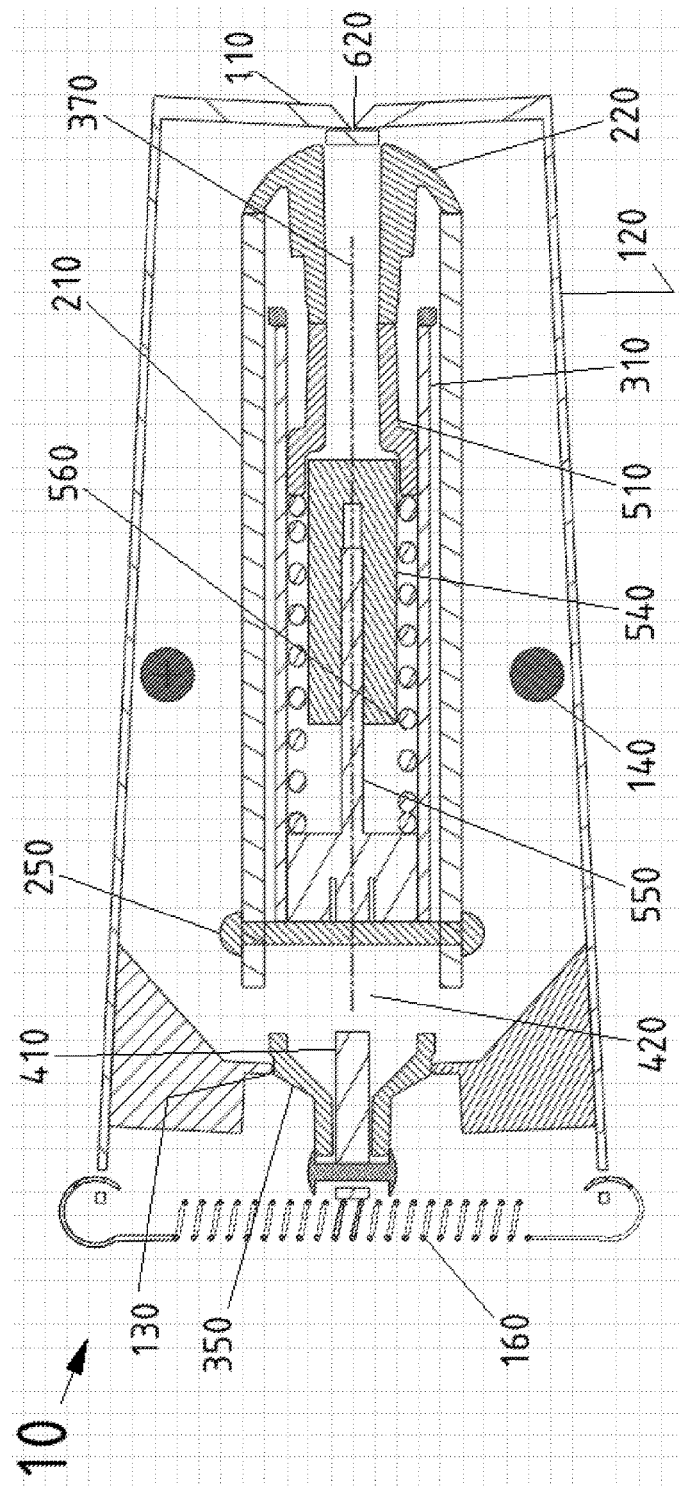
FIG. 10 is a cross-section view of the main operating parts of the locking firearm holder of FIG. 1, as depicted in the locking firearm holder's "locked state."

FIG. 10 shows a cross-section in the Locking State, depicting the trigger guard 620 of the hand gun trapped between the capture lever protrusions 110 and the slider end cap 220. The capture lever 120 has pivoted around the pivots 140 to move the capture lever to the lock position, because the capture lever cam followers 130 at the other end of the capture lever 120 have moved away from the locking firearm holder longitudinal centerline (at the line "370") as they climbed the capture lever cams 350. The slider limit screw 250 is seen at its limit of travel in the slider motion limit slot 420. All forces attempting the pull the trigger guard 620 out of the capture lever protrusions are referred to this point (i.e., slot 420). It should be noted that the rotor spring shaft 540, and with it the withdrawal limiter 550, have pulled completely out of the slider motion limit slot 420 because the rotor 510 has moved so far to the right (in this view), pushed by the rotor spring 560. This was made possible by the rotor's stator cam followers entered the slots in the stator cam (see FIG. 9 for an illustration of this). FIG. 10 also illustrates the capture lever spring 160, the stator 310, the slider 210, and the mounting arm 410.

As an optional arrangement, the locking firearm holder of the type described above could be modified so that the capture lever cam is implemented as a rotary cam on the rotor, which is also envisioned by the inventors. In this case, the stator cams could all be identical.

As another optional arrangement, the locking firearm holder of the type described above could be modified so that the stator and or slider cams are implemented as one or more linear cams on the rotor, which is also envisioned by the inventors.

As a further optional configuration, a locking firearm holder of the type described above is envisioned with an absolute limit on the slider motion, and thus on the motion of the firearm gripped by the capture lever protrusions.

As yet another optional arrangement, the locking firearm holder of the type described above could be modified so that the spring shaft 540 is replaced by a small shock absorber, to prevent accidental actuation of the firearm release due to a sharp vibration or shock to the vehicle the locking firearm holder is mounted to.

In more general terms from that described above, the combination of the "first cam" and its "first cam follower" provides two alternating stable mechanical states. The combination of the "second cam" and its "second cam follower" forces the first cam to change between those stable states. The combination of the "third cam" and its "third cam follower" actuates the capture lever; i.e., the third cam and follower force the capture lever to either unlock or lock, whichever is the opposite from the capture levers' present state. The first cam and the first cam follower can also be referred to as a "first lock portion," while the second cam and the second cam follower can also be referred to as a "second lock portion," and the third cam and the third cam follower can also be referred to as a "third lock portion" of the overall assembly.

It will be understood that each of the first, second, and third cams could be replaced by a different type of mechanical arrangement without departing from the principles that are disclosed herein. For example, the combination of the first cam and its first cam follower could be replaced by a first mechanical arrangement that still performs the function of providing two alternating stable mechanical states; the combination of the second cam and its second cam follower could be replaced by a second mechanical arrangement that still performs the function of forcing the first mechanical arrangement to change between those two stable states; and the combination of the third cam and its third cam follower could be replaced by a third mechanical arrangement that still performs the function of actuating the capture lever; i.e., to force the capture lever to either unlock or lock.

Second Embodiment

Receiving State

Figure 11:
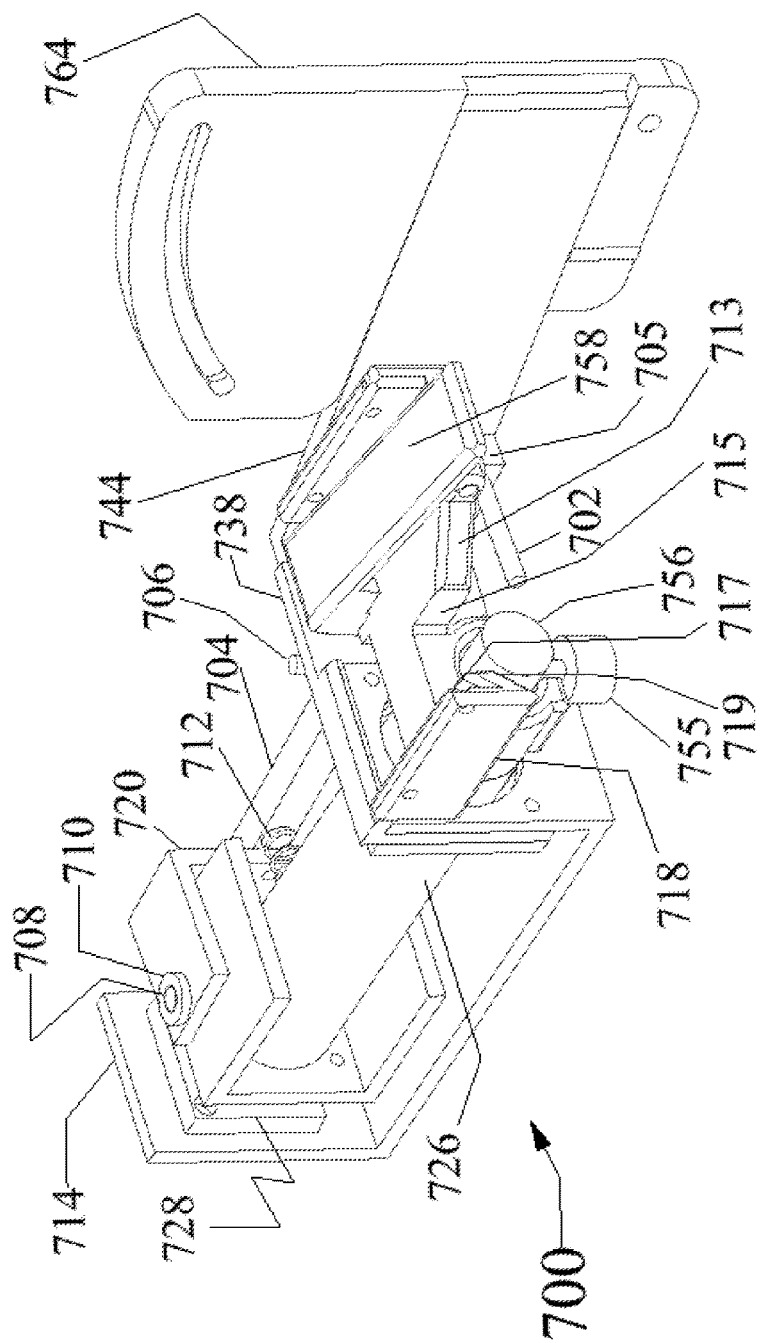
FIG. 11 is a perspective view of a second embodiment locking firearm holder, as constructed according to the principles of the technology disclosed herein, as depicted in the locking firearm holder's "receiving state."

Referring now to FIG. 11, a second embodiment locking firearm holder, generally designated by the reference numeral 700, is depicted in its receiving (i.e., its non-capture or "unlock") state. A protrusion 702 extending from a capture lever 704 is illustrated in its unlocked position. This capture lever 704 can rotate on a pivot 708, which has pivot bearings 710, and is mounted in a pivot support 720. A third cam follower (also referred to herein as a "lever cam follower") 706 is held in contact with a third cam (also referred to herein as a "lever cam") 738 by a lever spring 712 (see FIG. 15). Note that the lever cam follower 706 is positioned at the outer edge of a lobe (or "ramp") 740 of the lever cam 738 (see FIG. 14), and thus holds the capture lever 704 in the unlock state.

The capture lever 704, its protrusion 702, and their associated pivot mountings (e.g., the lever pivot bearings 710, etc.) make up an overall capture lever subassembly in which the capture lever 704 either moves to an unlock position to receive a firearm or moves to a lock position to hold a firearm in place. In this illustrated embodiment, the capture lever 704 includes the protrusion 702 that extends from the lever 704. The end of the capture lever 704 that is proximal to the protrusion is designated at the reference numeral 705, on FIGS. 11 and 12.

A slider 726 is attached to a slider end cap 718 (also referred to herein as a "firearm receiver"), which is designed to receive a hand gun trigger guard 770 in a groove 716. A trigger guard adjust 756 can be moved along the firearm holder's longitudinal axis, and then locked in position with a screw 755 to accommodate trigger guards of varying thicknesses so that the firearm is constrained as tightly as desired. Also shown is a mounting arm 744 having a mounting adjustment plate 764. In conjunction with other hardware not shown, this is used for mounting the locking firearm holder 700 to some stable substrate, such as an automobile. The mounting adjustment plate 764 will permit a user to adjust the angle, elevation, and distance of the locking firearm holder 700 relative to the position of the user, for the convenience of the user.

Figure 15:
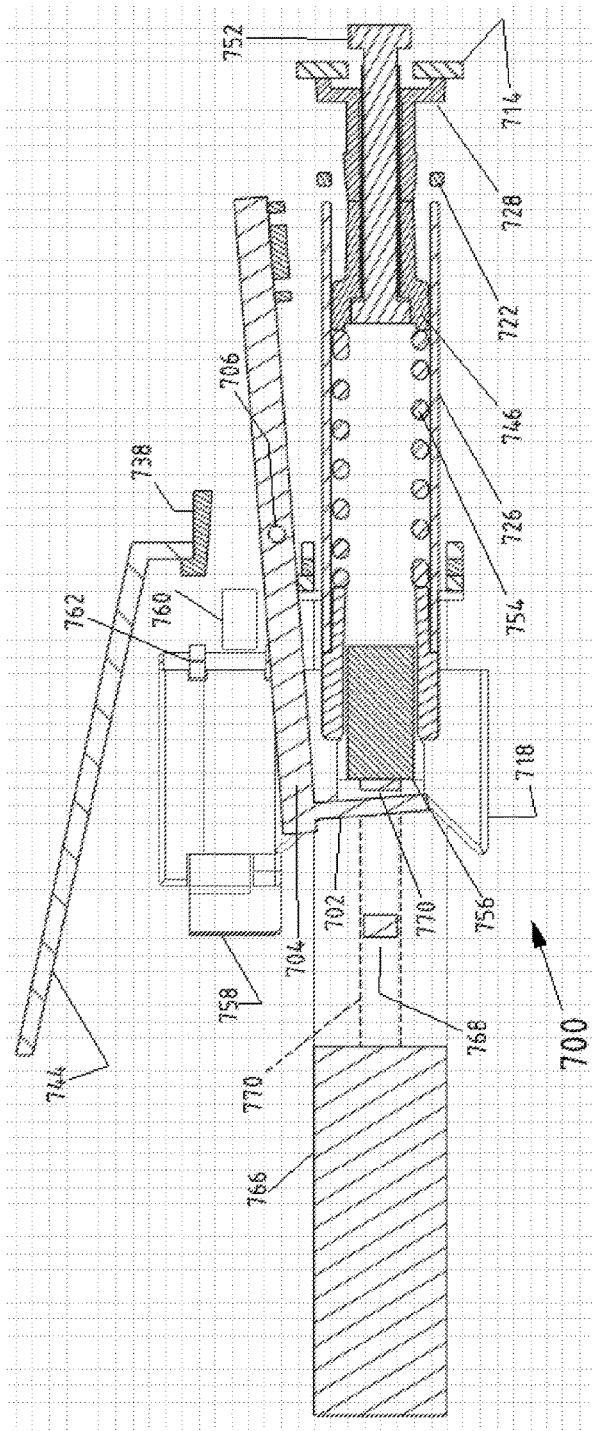
FIG. 15 is a side elevational view, partly from below, of the main operating parts of the locking firearm holder of FIG. 11, showing a hand gun pressing against the slider end cap as the gun is about to be captured, during the locking firearm holder's "inserting state." (Some outer parts are removed to reveal hidden inner parts.)

The firearm holder 700 has a longitudinal axis that is substantially parallel to the direction of movement of the firearm receiver 718 (also known as the "slider end cap), which is essentially in the same direction as that of the firearm itself, when it is inserted into the firearm holder's receiving area, which is in the form of a large groove (i.e., the groove 716). This longitudinal axis is also sometimes referred to herein as the "first axis." In the illustrated embodiment, the capture lever 704 is elongated and runs approximately parallel to the first axis, while the protrusion 702 is in the form of a pin that extends from the capture lever in a direction that is approximately perpendicular to the first axis. As can be seen in FIG. 15, for example, the capture lever 704 is not truly parallel to the first axis, and since the capture lever is pivotable, it certainly does not remain in the same exact orientation with the first axis at all times. Thus, the same thing can be said about the protrusion 702: it is not truly perpendicular to the first axis, and it also would not remain in the same exact orientation with the first axis at all times.

It will be understood that the protrusion 702 basically can comprise any type of protrusion that extends from capture lever to create a "physical barrier to withdrawal of the firearm" when in the "lock state." Moreover, the protrusion 702 can either comprise a pair of extensions (i.e., one extension 702 protruding from capture lever 704 and one extension (not shown) from an opposite part (the firearm receiver 718) that come into close proximity to one another when the capture lever enters the lock state; or the protrusion 702 can comprise a single extension that protrudes from only one of the two sides of the groove 716 for receiving the firearm (see FIG. 13), and which extends almost all the way to the other side of the groove 716. (In other words, the single extension could protrude at 702 from only the capture lever 704, and the other side of the groove 716 could have no protrusion at all.)

Figure 12:
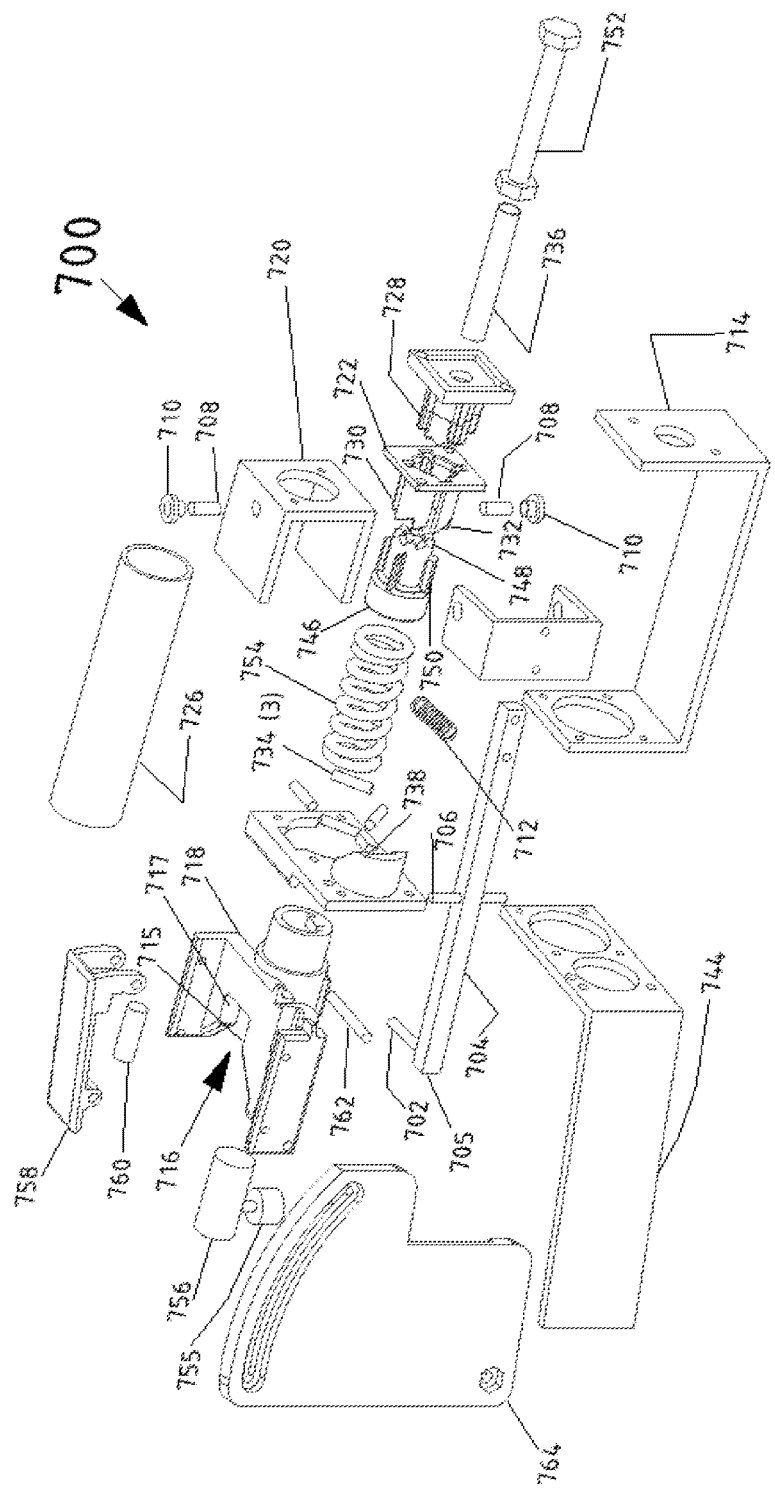
FIG. 12 is an exploded view of most of the major components of the second embodiment locking firearm holder of FIG. 11.

The "groove" area at 716 includes two side walls 715 and 717, as seen on FIGS. 11 and 12, which are sized and shaped to receive a portion of a firearm, more specifically in the illustrated embodiments, to receive a trigger guard of a hand gun. There are two sloped side walls 713 and 719 to help guide the weapon into the groove 716, as viewed on FIG. 11. The sloped side walls 713 and 719 allow the user to easily emplace the weapon into the firearm holder 700 using only the sense of touch, and without actually viewing the emplacing motions.

The overall shape and structure of these walls provides a partial enclosure that will be used to hold the firearm in place, once that firearm has been sufficiently inserted into the groove 716 to engage the locking action, as discussed herein. This partial enclosure is comprised mainly of the groove area 716, itself, including the side walls 715 and 717 that are part of the firearm receiver 718. It will be understood that the exact shape of the wall structure that makes up the partial enclosure can be modified without departing from the principles of the technology disclosed herein. For example, the walls could comprise a single, continuous arcuate shape, rather than consisting of multiple flat surfaces. Moreover, the walls could be made of an irregular material, such as a mesh or screen, instead of a flat solid plastic or metal material.

The partial enclosure requires some type of opening so as to receive the firearm. In the second illustrated embodiment, that opening is between the two side walls 715 and 717, at the entrance of the groove area 716. To complete the "enclosure effect" for the firearm holder 700, the protrusion 702 is used to close off that opening. This is accomplished when the capture lever 704 is moved toward the centerline of the firearm holder 700; and when that occurs, as discussed below in greater detail, the protrusion 702 is moved toward the side wall 717.

The mounting arm 744 is attached to the stator 714 and to the lever cam 738. A lock tab (or "lock key") 758, with associated lock cam 762 and a lock rod 760 (see FIG. 15), act to keep the locking firearm holder 700 in the lock state when the slider 726 is fully extended away from the stator 714. The lock rod 760 is attached to the lever cam 738, which is part of the stationary portion of the locking firearm holder 700. When the locking firearm holder is in the receiving (unlock) state, the lock cam 762 rides along the circular side of the lock rod 760. But when in the lock state, as the slider 726 withdraws from the stator 714, the spring-loaded lock tab 758 and its lock cam 762 move, interposing the lock cam 762 in the path of the lock rod 760. This prevents motion of the slider-related components from moving toward the stator-related components. When the user grips the firearm to unlock it, his finger will depress the lock tab 758, moving the lock cam 762 out of the path of the lock rod 760 and allowing motion back to the receiving state. The purpose of this lock tab is to prevent a heavy firearm from accidentally unlocking the holder 700, solely due to vibration, while the automobile is driving on a bumpy road, for example.

General Parts Exploded View

FIG. 12 is an exploded view of many of the parts that make up the second embodiment locking firearm holder 700. When emplaced in the locking firearm holder 700, a hand gun (not shown in this view) can be retained by the capture lever protrusion 702, which traps the trigger guard 770 of the hand gun 766 (see FIG. 14) between the capture lever protrusion 702 and the end cap 718 (specifically the groove 716) of the slider 726. A trigger guard adjuster 756 can be moved axially (along the first axis) and locked in position with a screw 755 to accommodate trigger guards of varying thicknesses, so that the firearm is constrained as tightly as desired.

The capture lever protrusion 702 attaches to capture lever 704, which can rotate on a pivot 708. The protrusion 702 is located proximal to a distal end of the capture lever 704 in which, on this view of FIG. 12, the distal end is to the left. The pivot is supported on bearings 710, which reduce friction. In the capture lever 704 is the lever cam follower 706, which rides on the lever cam 738. The lever spring 712 holds the lever cam follower 706 in contact with the lever cam 738.

The pivot 708 is attached to the slider 714 at the pivot support 720. The slider 726 and all other items attached to it slide relative to the stator 714 and all other items attached thereto. There are four stator/slider bearings: three front bearings 734 and one rear bearing 736, which facilitate the sliding motion of the slider 726 relative to the stator 714.

Items attached to the slider 726 include the slider end cap 718 (the firearm receiver), the slider pivot support 720, a second cam 722 (also referred to herein as a "slider cam" 722), which is an outer rotary cam with slots 730, the capture lever 704, the lever protrusion 702, the lever cam follower 706, the lever pivots 708, the lever bearings 710, and the lever spring 712. There is a motion lock comprising lock tab 758, a lock rod 760, and a lock cam 762. The lock cam 762 rides on the circular side of the lock rod 760 until the slider 726 moves to the locking position, whereupon the lock cam 762 interposes in the path of the lock rod 760. The lock tab and the lock cam move with the slider 726, whereas the lock rod moves with the stator 714.

Items attached to the stator 714 include a first cam 728 (also referred to herein as a "stator cam" 728), the four stator/slider bearings (three front 734 and one rear 736), the lever cam 738, and the mounting arm 744 (which has a mounting adjustment plate 764).

Inside the stator 714 is a rotor 746. Integral to the rotor are two cam followers: a first cam follower 748 (also referred to herein as a "stator cam follower" 748), which rides on the stator cam 728, and a second cam follower 750 (also referred to herein as a "slider cam follower" 750), which rides on the second cam (i.e., the slider cam) 722. A rotor spring 754 urges the rotor 746 toward the stator cam 728, and holds the rotor 746 in contact with the stator cam 728 and/or the slider cam 722. Thus, the rotor spring 754 biases both the first cam follower 748 and the second cam follower 750 against their respective first and second cams 728 and 722. A withdrawal limiter 752 fits inside the rotor 746 and prevents the slider from pulling out of the stator and inappropriately closing the capture lever 704.

Two types of relative motion take place in the locking firearm holder 700. The first motion is along the longitudinal axis (the "first axis") of the locking firearm holder 700. During insertion, when the user places the gun's trigger guard 770 in the slider end cap groove 716 and pushes, all items attached to the slider 714 then slide away from the user. Thereafter, when the user releases the gun, the rotor spring 754 pushes the slider assembly toward the user. Absolute limits on this motion are set by the withdrawal limiter 752, but the rotor 746 influences how far back toward the user the slider 714 is able to slide. It does so by virtue of the second form of relative motion in the locking firearm holder 700, i.e., rotation of the rotor 746. The rotor 746 has two different rotary cam followers: the stator cam follower 748 and the slider cam follower 750. There are two types of stator cam lobes, which alternate around the stator cam 728; one terminates in a notch 732 and the other in a slot 730. The slot 730 allows the rotor 746 (and thus the slider 714) to move closer to the user, thus locking the capture lever 704 (see FIG. 15). Recall that the terms "slot" and "notch" are more precisely defined in the discussion of the first embodiment (illustrated in FIGS. 1-10).

The slider cam 722 plays a key role in the capture lever 704 alternating between unlock and lock states. When the stator cam follower 748 reaches the end of the current lobe of the stator cam 728, the notch 732 or slot 730 restrains it from further rotation. However, when the user pushes on the slider 726, the rotor 746 is pushed out of contact with the slider cam 722. The stator cam 728 now controls relative motion and, under the influence of the pressure between the stator cam and rotor, forces a small rotation of the rotor 746, which causes the rotor stator cam follower 748 to line up on the next lobe of the slider cam 722. Thus each individual push on the slider end cap 718 moves the locking firearm holder between two states: unlock and lock.

Receiving State—Continued

Figure 13:
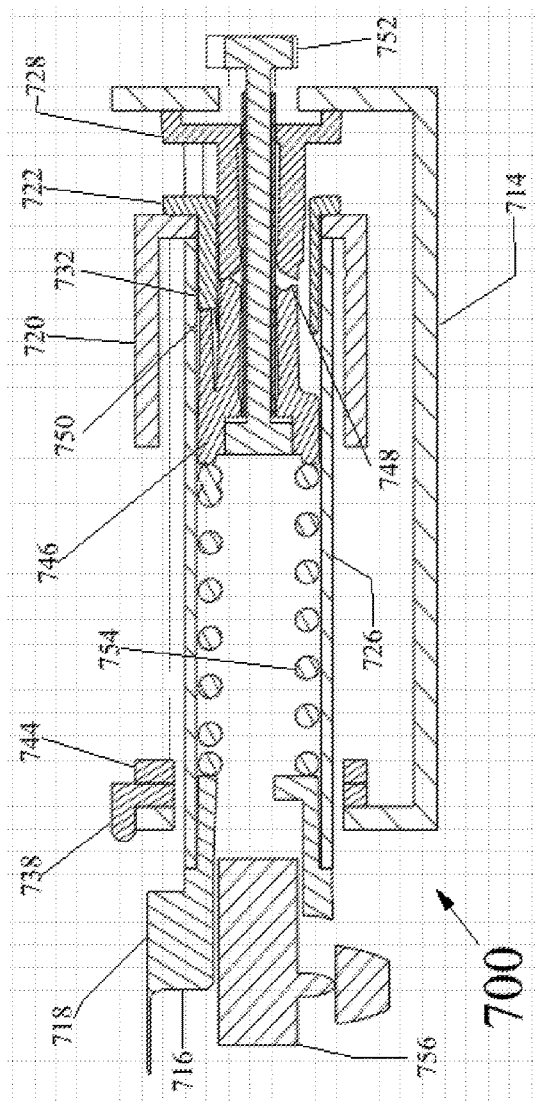
FIG. 13 is a cross-section view of the main operating locking firearm holder for implementing the unlock and lock states of the locking firearm holder of FIG. 11, as depicted in the locking firearm holder's "receiving state."

Assuming a plane passing through the axis of the firearm holding locking firearm holder 700 and the middle of the capture lever 702 to be horizontal, then FIG. 13 illustrates a cross-sectional plane that is oriented at 45 degrees with respect to the horizontal, which better illustrates the slider cam followers 750 resting on the slider cam notches 732. This portrays the fundamental constraint on how far forward the lever cam follower 706 can go along the lever cam 738, which is what keeps the capture lever 702 in the unlocked position. (See FIG. 11.)

Note that withdrawal limiter 752 penetrates through the rotor 746, the rear bearing 736, the slider cam 722, and the stator cam 728. The withdrawal limiter 752 prevents the slider 726 from being manually pulled back. As a hypothetical example, the protrusion 702 on the capture lever 704 might otherwise snag the user's sleeve and cause the capture lever 704 to prematurely lock while the user is withdrawing the gun; however, withdrawal limiter 752 arrests the motion of the slider 726 and thereby prevents that snagging situation from occurring. The withdrawal limiter 752 is held by the rotor. The rotor spring 754 provides the force to move the rotor 746. As discussed above, the rotor 746 includes two cam followers: the slider cam follower 750 (which is shown resting on the slider cam 722, specifically in the notch of the cam) and the stator cam follower 748 (which is shown in contact with the stator cam 728).

Inserting State

Figure 14:
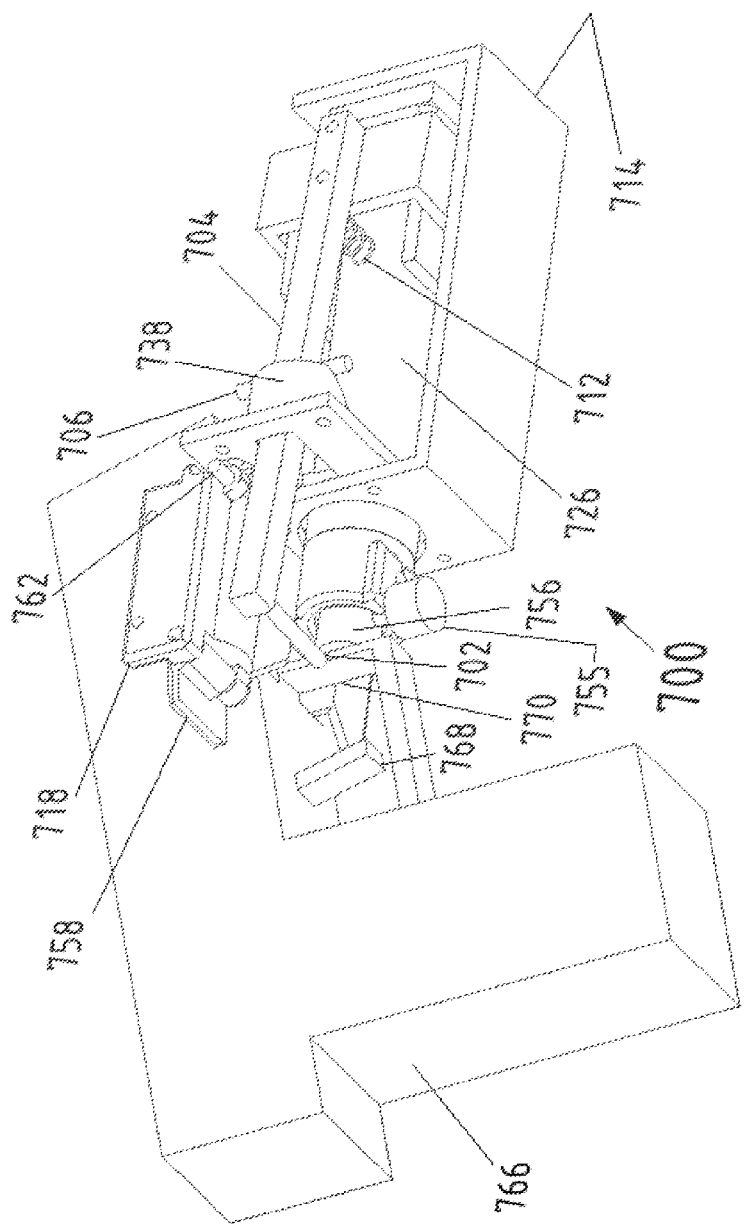
FIG. 14 is a perspective view of the locking firearm holder of FIG. 11, as depicted in the locking firearm holder's "inserting state," showing a hand gun being placed into the slot area between the capture lever pair.

Referring now to FIG. 14, the user has pushed a hand gun 766 into the locking firearm holder 700. The capture lever 704 is in the unlocked position in this view and has retracted back beneath the slider end cap 718, and the slider 726 is pushed back relative to the stator 714. The trigger guard 770 is resting on the trigger guard adjust 756 with its locking screw 755. Note that the trigger 768 is safely away from interference. The lever spring 712 is shown holding the capture lever 704 away from the centerline of the locking firearm holder 700 and the lever cam follower 706 in contact with the lever cam 738. The lock tab is down with the lock cam below the lock rod (not shown in this view), not interfering with slider 726 motion.

Locking State

Immediately after inserting the firearm 766 to the travel stop, the user relaxes the pressure on the firearm 766, which allows the rotor spring 754 to push the slider 726 out to its maximum position. As seen in FIG. 15, this allows the lever cam follower 706 to ramp along the lever cam 738, which pushes the front of the capture lever 704 toward the locking firearm holder 700 centerline so that, in conjunction with the pivot 708 (see FIG. 12), the capture lever protrusion 702 will lock, trapping the trigger guard 770 between the capture lever protrusion 702 and the slider end cap 718, specifically the trigger guard adjust 756 (with its locking screw 755—see FIG. 12).

It should be noted that the protrusion 702 does not actually need to abut against any structural element; it only needs to come close enough to capture the firearm. As seen in FIG. 14, the protrusion will extend into the open area of the trigger guard, and when the firearm holder 700 has moved into its fully locked state, the protrusion 702 will have its extending tip come very close to a distal portion of the partial enclosure; in FIG. 15, that distal portion is part of the end cap 718 (also referred to as the firearm receiver). However, the distal portion of the partial enclosure is not necessarily the side wall 717. In the second illustrated embodiment, the protrusion 702 extends a short distance below that side wall 717, but comes very close to it, and to the portion of the partial enclosure that is just below side wall 717, to capture the trigger guard. In other words, the distal portion of the partial enclosure can be designed to be at more than one location, depending on the designer's choice, so long as the tip of the protrusion 702 truly closes off the opening of that partial enclosure to a sufficient extent so as to prevent the firearm from being removed, while the firearm holder 700 is in its locked state.

In this state, the capture lever 704 has pivoted around the pivots 708 to the lock position, because the lever cam follower 706 at has moved toward from the locking firearm holder longitudinal centerline as it moved along the lever cam 738. The trigger 768 is safely away from any interference. The withdrawal limiter 752 is shown. Inside the slider tube 726, the rotor 746 is shown pushed deeply into the slider cam 722. This allows the slider 726 and all attached to it to move a corresponding amount to the left (in this view), which forces the lever cam follower 706 down (in this view), and the ramp 740 to move the capture lever 704 to the lock state.

Note that the lock tab 758 and the lock cam 762 have gone so far to the left (in this view) that the lock cam 762 has come out of contact with the stationary lock rod. Under the influence of the spring-loaded lock tab 758, the lock cam has moved to interpose itself behind the lock rod 760. Thus slider motion to the right (in this view) of the slider 726 and all attached to it is blocked until the lock tab 758 is pressed to move the lock cam 762 out of the path of the lock rod 760.

Figure 16:
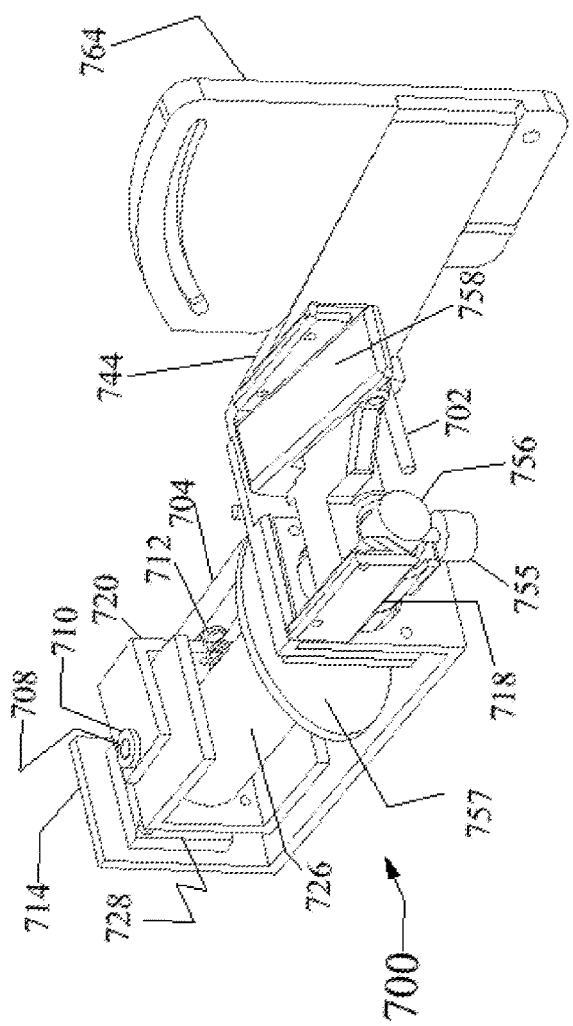
FIG. 16 is a perspective view of a third embodiment locking firearm holder, as constructed according to the principles of the technology disclosed herein, which is similar to the second embodiment, but the lever cam is implemented as a rotary cam on the rotor, rather than as a linear cam.

As an optional arrangement, the locking firearm holder of the type described above could be modified so that the lever cam is implemented as a rotary cam on the rotor, which is also envisioned by the inventors. In this case, the stator cams could all be identical. Refer to FIG. 16 which illustrates this mechanical arrangement. The slider 726 is shrunk to be an internal tube over most of its length, rather than an external tube which encloses the rotor 746 and other components. The rotor now has an additional feature: a rotary cam 757 which replaces the linear cam 738 (see FIG. 12) of the second embodiment. The capture lever 704 bears directly on this rotary cam as its rotary cam follower. This FIG. 16 is intended to illustrate that anyone skilled in the art can substitute linear cams for rotary cams, and vice versa, and would nevertheless fall within the principles of the technology disclosed herein.

Releasing State

When the user wishes to remove the firearm, the user must push the firearm into the locking firearm holder 700 sufficiently far to cause it to change from the lock state to the unlock state. If the user fails to push far enough, the lever capture protrusion 702 will immediately snap back to capture the firearm, faster than the user can remove the firearm. The user can be confident that the firearm has been pushed far enough, if the user pushes down to the limit of motion. Both audible and haptic feedback will also convey to the user that the firearm holder 700 has changed from the lock state to the unlock state. Similar comments apply when transitioning from the lock state to the unlock state.

In more general terms from that described above for the second embodiment, the combination of the "first cam" and its "first cam follower" provides two alternating stable mechanical states. The combination of the "second cam" and its "second cam follower" forces the first cam to change between those stable states. The combination of the "third cam" and its "third cam follower" actuates the capture lever; i.e., the third cam and its follower force the capture lever to either the unlock or lock state, whichever is the opposite from the present state of the capture lever. The first cam and the first cam follower can also be referred to as a "first lock portion," while the second cam and the second cam follower can also be referred to as a "second lock portion," and the third cam and the third cam follower can also be referred to as a "third lock portion" of the overall assembly.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A locking firearm holder, comprising:
   (a) a receiving portion, having:
      (i) a movable firearm receiver that moves along a first axis, said firearm receiver forming a partial enclosure having an opening, and with a distal portion;
      (ii) a pivotable lever that has at least one protrusion that extends at an angle that is approximately perpendicular to said first axis;
   wherein:
      (iii) said locking firearm holder enters into a lock state if said lever is moved such that said at least one protrusion is moved toward said distal portion of the firearm receiver, and
      (iv) said locking firearm holder enters into an unlock state if said lever is moved such that said at least one protrusion is moved away from said distal portion of the firearm receiver;
   (b) a first cam having a plurality of first lobes;
   (c) a biased first cam follower having a plurality of second lobes that moves against said plurality of first lobes, wherein with respect to contacting said plurality of first lobes, said second lobes of the first cam follower have only a possible first stable state and a possible second stable state;
   (d) a second cam having a plurality of third lobes;
   (e) a biased second cam follower that moves against said plurality of third lobes;
   (f) a third cam having at least one fourth lobe;
   (g) a biased third cam follower that moves against said at least one fourth lobe, wherein a position of said third cam follower depends upon a position of said plurality of second lobes of the first cam follower, wherein:
      (i) if said plurality of second lobes are in one of said possible first stable state and said possible second stable state, then said third cam follower is forced to move into one of a first position and a second position, and
      (ii) if said plurality of second lobes are in the other one of said possible first stable state and said possible second stable state, then said third cam follower is forced to move into the other one of said first position and said second position;
      (iii) if said third cam follower is in said first position, then the pivotable lever and said at least one protrusion are forced to move into said unlock state; and
      (iv) if said third cam follower is in said second position, then the pivotable lever and said at least one protrusion are forced to move into said lock state; and
   (h) a rotor that includes both said first cam follower and said second cam follower so that they move together;
   (i) wherein: said plurality of third lobes are phased slightly differently so that said second cam, if actuated, will sufficiently advance said rotor to place said first cam follower over the next of said plurality of first lobes of said first cam.

2. The locking firearm holder of claim 1, wherein said first cam has an even number of said first lobes.

3. The locking firearm holder of claim 1, wherein each of said plurality of first lobes terminates in one of: (i) a notch, and (ii) a slot.

4. The locking firearm holder of claim 3, wherein: if said first cam follower is in a stable state, then said second lobes are resting either in said notch or said slot, of one of said plurality of first lobes.

5. The locking firearm holder of claim 1, wherein said at least one fourth lobe of said third cam comprises a sloped ramp.

6. The locking firearm holder of claim 1, wherein a number of the third lobes of said second cam is the same as a number of the first lobes of said first cam.

7. The locking firearm holder of claim 1, wherein a number of the first lobes of said first cam is twice a number of the second lobes of said first cam follower.

8. The locking firearm holder of claim 1, wherein a firearm can be placed into said firearm receiving portion and retained by said at least one protrusion if said pivotable lever is in said lock state.

9. The locking firearm holder of claim 8, wherein said pivotable lever extends from a location substantially proximal to said third cam to a location of said protrusion.

10. The locking firearm holder of claim 9, wherein said at least one protrusion and said pivotable lever are constructed to be substantially stronger than said third cam and said third cam follower, such that, if said locking firearm holder is tampered with, a combination of said third cam and said third cam follower will structurally fail before either of said at least one protrusion and said pivotable lever, thereby making said locking firearm holder substantially tamper proof.

11. The locking firearm holder of claim 1, wherein to insert a firearm, said firearm must be pushed against said movable firearm receiver, which forces said rotor to actuate said pivotable lever, to enter said lock state.

12. The locking firearm holder of claim 1, wherein to remove a firearm that has been captured by said at least one protrusion, said firearm must be initially pushed against said movable firearm receiver, which forces said rotor to actuate said pivotable lever, to enter said unlock state.

13. The locking firearm holder of claim 1, wherein said pivotable lever has a first distal end and said at least one protrusion is positioned proximal to said first distal end; further comprising: a second pivotable lever that is oriented approximately parallel to said pivotable lever and works in conjunction with the pivotable lever, said second pivotable lever having a second distal end that is oriented in substantially the same direction as the first distal end of said pivotable lever.

14. The locking firearm holder of claim 13, wherein said at least one protrusion comprises:
   (a) a first protrusion that extends proximal to the first distal end of said pivotable lever;

(b) a second protrusion that extends proximal to the second distal end of said second pivotable lever;

wherein said first and second protrusions move toward one another to capture a firearm, if said locking firearm holder is entering said lock state.

15. The locking firearm holder of claim 1, wherein said first cam, said second cam, and said third cam are all rotating action cams.

16. The locking firearm holder of claim 1, wherein said first cam and said second cam are rotating action cams, and said third cam is a linear action cam.

17. A locking firearm holder comprising:
   (a) a receiving portion, having:
      (i) a movable firearm receiver that moves along a first axis, said firearm receiver forming a partial enclosure having an opening, and with a distal portion;
      (ii) a pivotable lever that has at least one protrusion that extends at an angle that is approximately perpendicular to said first axis;
   wherein:
      (iii) said locking firearm holder enters into a lock state if said lever is moved such that said at least one protrusion is moved toward said distal portion of the firearm receiver, and
      (iv) said locking firearm holder enters into an unlock state if said lever is moved such that said at least one protrusion is moved away from said distal portion of the firearm receiver;
   (b) a first lock portion that can exist in only two possible stable mechanical states, a first stable state and a second stable state;
   (c) a second lock portion that displaces if said movable firearm receiver is pushed by user actuation, and, when so actuated, said second lock portion forces said first lock portion to change states;
   (d) a third lock portion, wherein:
      (i) if said first lock portion is in said first stable state, then said third lock portion forces said pivotable lever and said at least one protrusion to move toward said distal portion of the firearm receiver;
      (ii) if said first lock portion is in said second stable state, then said third lock portion forces said pivotable lever and said at least one protrusion to move away from said distal portion of the firearm receiver; and
   (e) a withdrawal limiter that is biased against said second lock portion;
   (f) wherein: if said locking firearm holder is being forced into said unlock state, then said withdrawal limiter physically interferes with a motion of at least one of said second lock portion and said third lock portion, to prevent premature displacement of said at least one protrusion toward said distal portion of the firearm receiver.

18. The locking firearm holder of claim 17, wherein: said first lock portion comprises a first cam having a first at least one cam follower; said second lock portion comprises a second cam having a second at least one cam follower; and said third lock portion comprises a third cam having a third at least one cam follower.

19. The locking firearm holder of claim 17, wherein:
   (a) if a user pushes a firearm against said movable firearm receiver while the locking firearm holder is in said unlock state, then said at least one protrusion is moved toward said distal portion of the firearm receiver, and said at least one protrusion will move into a position so as to capture said firearm, such that the locking firearm holder enters said lock state; and
   (b) if a user pushes a firearm against said movable firearm receiver while the locking firearm holder is in said lock state, then said at least one protrusion is moved away from said distal portion of the firearm receiver, and said at least one protrusion will move into a position so as to release said firearm.

20. The locking firearm holder of claim 19, further comprising a lock tab that is actuated by the hand of a human user as the user grasps said firearm to release the firearm from the locking firearm holder, wherein said lock tab must be actuated before allowing said locking firearm holder to enter said unlock state.

21. A locking firearm holder comprising:
   (a) a receiving portion, having:
      (i) a movable firearm receiver that moves along a first axis, said firearm receiver forming a partial enclosure having an opening, said opening being sized and shaped to receive a portion of a firearm, said partial enclosure including at least one wall to form said opening, and said at least one wall having a distal portion;
      (ii) a pivotable lever that has at least one protrusion that extends at an angle that is approximately perpendicular to said first axis;
   wherein:
      (iii) said locking firearm holder enters into a lock state if said lever is moved such that said at least one protrusion is moved toward said distal portion of the firearm receiver, and
      (iv) said locking firearm holder enters into an unlock state if said lever is moved such that said at least one protrusion is moved away from said distal portion of the firearm receiver;
   (b) a first lock portion that can exist in only two possible stable mechanical states, a first stable state and a second stable state;
   (c) a second lock portion that displaces if said movable firearm receiver is pushed by user actuation, and, when so actuated, said second lock portion forces said first lock portion to change states; and
   (d) a third lock portion, wherein:
      (i) if said first lock portion is in said first stable state, then said third lock portion forces said pivotable lever and said at least one protrusion to move toward said distal portion of the firearm receiver;
      (ii) if said first lock portion is in said second stable state, then said third lock portion forces said pivotable lever and said at least one protrusion to move away from said distal portion of the firearm receiver.

22. The locking firearm holder of claim 21, wherein:
   (a) if a user pushes a firearm against said movable firearm receiver while the locking firearm holder is in said unlock state, then said at least one protrusion is moved toward said distal portion of the firearm receiver, and said at least one protrusion will move into a position so as to capture a trigger guard of said firearm, such that the locking firearm holder enters said lock state; and
   (b) if a user pushes a firearm against said movable firearm receiver while the locking firearm holder is in said lock state, then said at least one protrusion is moved away from said distal portion of the firearm receiver, and said at least one protrusion will move into a position so as to release said firearm.

\* \* \* \* \*